(12) United States Patent
Aoki et al.

(10) Patent No.: US 6,895,998 B2
(45) Date of Patent: May 24, 2005

(54) VALVE ATTACHED TO FUEL TANK

(75) Inventors: Tomohide Aoki, Nishikasugai-gun (JP);
Hiroaki Kito, Nishikasugai-gun (JP);
Hiroshi Nishi, Nishikasugai-gun (JP);
Kenichiro Kaneko, Nishikasugai-gun (JP); Masayuki Nakagawa, Nishikasugai-gun (JP); Masahiro Ando, Nishikasugai-gun (JP)

(73) Assignee: Toyoda Gosei, Co., Ltd., Aichi-ken (JP)

( * ) Notice: Subject to any disclaimer, the term of this patent is extended or adjusted under 35 U.S.C. 154(b) by 0 days.

(21) Appl. No.: 10/713,003

(22) Filed: Nov. 17, 2003

(65) Prior Publication Data
US 2004/0094200 A1 May 20, 2004

Related U.S. Application Data

(62) Division of application No. 09/987,147, filed on Nov. 13, 2001, now Pat. No. 6,679,282.

(30) Foreign Application Priority Data

| Nov. 17, 2000 | (JP) | 2000-351639 |
| Mar. 7, 2001 | (JP) | 2001-62970 |
| Sep. 11, 2001 | (JP) | 2001-275485 |

(51) Int. Cl.[7] ............................................. F16K 15/06
(52) U.S. Cl. ....................................................... 137/592
(58) Field of Search ................................ 137/202, 592

(56) References Cited

U.S. PATENT DOCUMENTS

| 5,139,043 A | 8/1992 | Hyde et al. |
| 5,404,907 A | 4/1995 | Benjey et al. |
| 6,035,883 A | 3/2000 | Benjey et al. |
| 6,408,867 B2 | 6/2002 | Aoki et al. |
| 6,422,261 B1 | 7/2002 | DeCapua et al. |
| 6,484,741 B2 * | 11/2002 | Benjey et al. ............... 137/202 |
| 6,502,607 B2 * | 1/2003 | Brown et al. ................ 137/587 |
| 6,679,282 B2 * | 1/2004 | Aoki et al. .................. 137/202 |
| 2002/0117206 A1 | 8/2002 | Benjey et al. |

FOREIGN PATENT DOCUMENTS

JP    A-2001-163069    6/2001

OTHER PUBLICATIONS

U.S. Appl. No. 60/180,056.*

U.S. Appl. No. 60/191,658.*

* cited by examiner

*Primary Examiner*—Gerald A. Michalsky
(74) *Attorney, Agent, or Firm*—Posz Law Group, PLC

(57) ABSTRACT

Disclosed is a valve being attached to a fuel tank, the valve permitting a vaporized fuel to flow out and inhibiting a liquid fuel from flowing out. The valve includes a cover and a case. For example, the cover is bonded to an upper portion of a fuel tank, is independent of the fuel tank, and includes a connecting surface to be connected to the fuel tank and a flow-out passage in which a vaporized fuel flows out. The connecting surface has a connector portion formed of a resin exhibiting a good bondability to the fuel tank. The case is screwed to the cover, and includes an evaporator opening and a floating valve. The evaporator opening communicates with the flow-out passage. The floating valve opens or closes the evaporator opening.

5 Claims, 17 Drawing Sheets

VALVE ATTACHED TO FUEL TANK

This application is a divisional application of U.S. patent application Ser. No. 09/987,147, filed Nov. 13, 2001, now U.S. Pat. No. 6,679,282, which is based upon and claims benefit of Japanese Patent Applications No. 2000-351639 filed on Nov. 17, 2000, No. 2001-62970 filed on Jul. 3, 2001, and No. 2001-275485 filed on Nov. 9, 2001, the contents of which are incorporated herein by reference.

BACKGROUND OF THE INVENTION

1. Field of the Invention

The present invention relates to a valve attached to a fuel tank, which is disposed in a fuel tank of vehicles, such as automobiles, and the like.

2. Description of the Related Art

In a fuel tank of an automobile, there is disposed a valve attached to the fuel tank, such as a liquid-fuel flowing-out inhibition valve, an inlet check valve, etc.

Among these valves attached to a fuel tank, the liquid-fuel flowing-out inhibition valve inhibits a liquid fuel from flowing out into a vaporized fuel circulation system. Namely, adjacent to a fuel tank of an automobile, there is disposed a vaporized fuel circulation system, which is referred to as an evaporator circuit. The evaporator circuit introduces a vaporized fuel from a fuel tank into an outside canister, and stores it by adsorbing it on an activated carbon, or the like, thereby inhibiting the increment of the internal pressure, which results from the increment of the vapor pressure, in the fuel tank. The canister is joined to an engine. Accordingly, the vaporized fuel is released from the activated carbon by the inlet negative pressure of the engine, and is mixed into an air-fuel mixture. Thus, the vaporized fluid is again used as a fuel.

In the evaporator circuit, an opening, which is referred to as an evaporator opening, is formed in the fuel tank. The evaporator opening is usually formed at the uppermost portion of the fuel tank in order to inhibit the fuel from flowing in into the evaporator circuit. However, since the liquid surface of the fuel moves up and down, there might be a fear that the liquid fuel flows in into the evaporator opening. When the liquid fuel flows in and arrives at the canister, it adsorbs onto the activated carbon. Accordingly, there might arise a fear that the liquid fuel hinders the usual adsoprtion action of the activated carbon for the vaporized fuel.

Hence, a liquid-fuel flow-out inhibition valve has been disposed conventionally in the fuel tank in order to inhibit a liquid fuel from flowing out from the evaporator opening. For example, in FIG. 16, there is illustrated a cross-sectional view of a conventional liquid-fuel flow-out inhibition valve. The conventional liquid-fuel flowing-out inhibition valve comprises a cover 101 and a case 102. The cover 101 is formed on an upper portion of a fuel tank 100 integrally therewith. The case 102 is provided with an evaporator opening 103, which is formed through an upper portion of the case 102, and a floating valve 105, which is disposed in the case 102, and is engaged with an opening end of the cover 101 by an engagement claw 104. Note that the cover 101 communicates with an evaporator circuit that is not shown. Moreover, an O ring 106 is disposed in a space between an inner peripheral surface of the cover 101 and an outer peripheral surface of the case 102, and secures a liquid-proof ability.

Among the valves attached to a fuel tank, the inlet check valve inhibits a fuel and a vapor, held in a fuel tank, from flowing inversely when supplying a fuel. Namely, the fuel, which is supplied through a fuel supply opening, flows in into the fuel tank. At this moment, there might be a fear that the fuel and the fuel vapor, held in the fuel tank, flows inversely back to the fuel supply opening.

Hence, an inlet check valve has been interposed conventionally between a fuel filler pipe and a fuel tank in order to inhibit the fuel, and the like, from flowing inversely. For example, in FIG. 17, there is illustrated a cross-sectional view of an inlet valve set forth in Japanese Unexamined Patent Publication (KOKAI) No. 2,001-163,069. The inlet check valve 200 comprises a cylinder-shaped case 202, in which a valve body 201 is provided. An O ring 208 is fitted around an upstream-side outer peripheral surface of the case 202. Moreover, a fastening flange 209 is disposed on the outer peripheral surface. Then, an engagement claw 203 is formed at the peripheral edge of the fastening flange 209. While, a cylinder-shaped portion 206 is disposed on an outer wall of a fuel tank 205 protrudingly therefrom and integrally therewith. An engagement step 207 is disposed around an upstream-side outer peripheral surface of the cylinder-shaped portion 206. Then, the inlet check valve 200 is installed to the fuel tank 205 by engaging the engagement claw 203 of the case 202 with the engagement step 207 of the cylinder-shaped portion 206. Moreover, the O ring 208 contacts with an inner peripheral surface of the cylinder-shaped portion 206 elastically, thereby securing a sealing ability.

However, the above-described conventional liquid-fuel flow-out inhibition valve is associated with the following problems. First, since, the case and the cover is connected by the claw engagement, the connected portions merely scatter by the number of the claws on the case. Moreover, even when only one of the plurality of claws disengages, the swinging of the case might occur so that there might be a fear that the other claws disengage one after another successively. Moreover, the connected portions are usually immersed into the fuel. Accordingly, because of the swelling of the component members, there might arise a fear that the engagement claws are all the more likely to disengage. In view of these causes, it might be impossible to say that there might be no fear that the engagement claws disengage to come off the case from the cover.

Second, as described above, the liquid fuel flows out mainly from the evaporator opening. However, since the claw engagement is not good inherently in terms of the liquid-proof ability, there might arise a fear that the liquid fuel flows out through the space between the case and the cover. Accordingly, in the conventional liquid-fuel flow-out inhibition valve, the O ring is disposed in the space between the case and the cover, but is an extravagant component member. Namely, it is necessary to give a liquid-proof ability to the space between the case and the cover to a certain extent or more, but it is necessary to give an excessive liquid-proof ability thereto to such an extent that an O ring is disposed therein. When an O ring is provided in a liquid-fuel flow-out inhibition valve, the number of the component parts increases by the quantity. Moreover, a process for assembling the O ring is required, and consequently the manufacturing cost of the liquid-fuel flow-out inhibition valve goes up.

Here, in order to reduce the number of the component parts and in order to secure a liquid-proof ability to a certain extent or more, it is possible to think of the following arrangements. For instance, the cover and the case are connected by the claw engagement, but, in addition thereto, ribs and roots are disposed on the outer peripheral surface of the case and the inner peripheral surface of the cover, respectively, so that the space can be formed in a zigzagged manner between the case and the cover. However, the arrangements additionally require manufacturing steps for processing the outer peripheral surface of the case and the inner peripheral surface of the cover, and consequently the manufacturing cost increases. In addition, because of the complexity of the configurations, the arrangements cannot be applied to small-sized liquid-fuel flow-out inhibition valve.

While, in the conventional inlet check valve, the case and the fuel tank are bonded by the claw engagement similarly to the above-described conventional liquid-fuel flow-out inhibition valve. As a result, the conventional inlet check valve might have a problem that it is inferior in terms of the bondability. Moreover, the O ring is disposed in the space between the case and the fuel tank. Thus, the conventional inlet check valve suffers from a problem that the number of component parts is large. Namely, the conventional inlet check valve is associated with problems similar to those of the conventional liquid-fuel flow-out inhibition valve.

SUMMARY OF THE INVENTION

The present invention has been completed in view of the aforementioned problems. It is therefore an object of the present invention to provide a valve attached to a fuel tank, valve which is favorable in terms of the bondability, which can secure a liquid-proof ability to a certain extent or more, whose construction is simple, and whose number of component parts is less.

In order to achieve the aforementioned object, a valve attached to a fuel tank according to a first aspect of the present invention permits a vaporized fuel to flow out, inhibits a liquid fuel from flowing out, and comprises: a cover bonded to an upper portion of a fuel tank, being independent of the fuel tank, and including a connecting surface to be connected to the fuel tank, the connecting surface having a connector portion formed of a resin exhibiting a good bondability to the fuel tank, and a flow-out passage in which a vaporized fuel flows out; and a case screwed to the cover, and including an evaporator opening, communicating with the flow-out passage, and a floating valve for opening or closing the evaporator opening.

Namely, in the valve attached to the fuel tank according to the first aspect of the present invention, the cover and the case are bonded by screw (i.e., fastening by thread), not by claw engagement. Since the connection exists in a helical manner continuously, the case and the cover are less likely to disengage than the case where they are connected by claw engagement. Thus, when the component parts swell, there is no fear that the case comes off from the cover. Further, since the space between the male screw and the female screw is extremely small, it is possible to secure a liquid-proof ability without disposing a sealing member, such as an O ring, etc., between the cover and the case. Specifically, while securing a liquid-proof ability to a certain extent or more, it is possible to reduce the number of component parts. Furthermore, it is possible to freely attach the case to and detach it from the cover by screw fastening. Accordingly, it is very convenient, for instance, when inspecting, replacing, and so on, the floating valve, disposed in the case.

Moreover, in the valve attached to the fuel tank according to the first aspect of the present invention, the fuel tank and the cover are bonded by the connector portion, which is disposed in the cover. Hence, even when the fuel tank and the cover are formed of materials, which exhibit poor bondabilites to each other, it is possible to properly secure a liquid-proof ability, because the cover is bonded to the connector portion, which is disposed on the fuel-tank connecting surface and which is formed of a resin exhibiting a good bondability, in other words, because the specific connector portion is interposed between the cover and the fuel tank.

In order to furthermore achieve the aforementioned object, a valve attached to a fuel tank according to a second aspect of the present invention modifies the valve according to the first aspect of the present invention so that the cover has a first screwed portion, the case has a second screwed portion, and a sealing member is further interposed between the first screwed portion and the second screwed portion.

Namely, in the valve attached to the fuel tank according to the second aspect of the present invention, the sealing member is interposed between the male screw and the female screw of the portions, which are screwed together. Between the male screw and the female screw, there is formed a helix-shaped fine space. In the valve attached to the fuel tank according to the second aspect of the present invention, the sealing member is interposed between the male screw and the female screw to bury the fine space.

By the valve attached to the fuel tank according to the second aspect of the present invention, it is possible to furthermore improve a liquid-proof ability at the screwed portions (i.e., the connection between the cover and the case).

In order to furthermore achieve the aforementioned object, a valve attached to a fuel tank according to a third aspect of the present invention modifies the valve according to the first aspect of the present invention so that the cover has a case-contacting surface, which contacts with the case in the axial direction, the case has a cover-contacting surface, which faces the case-contacting surface, one of the case-contacting surface and the cover-contacting surface has a ring-shaped groove, and the other one thereof has a ring-shaped rib, which faces the ring-shaped groove; and a leading end of the ring-shaped rib is pressed against an inner wall of the ring-shaped groove by screwing the case to the cover.

Namely, in the valve attached to the fuel tank according to the third aspect of the present invention, the ring-shaped groove is disposed in one of the case-contacting surface and the cover-contacting surface, and the ring-shaped rib is disposed on the other one thereof. To put it concretely, when the ring-shaped groove is disposed in the case-contacting surface, the ring-shaped rib is disposed on the cover-contacting surface. On the other hand, when the ring-shaped rib is disposed on the case-contacting surface, the ring-shaped groove is disposed in the cover-contacting surface.

By the valve attached to the fuel tank according to the third aspect of the present invention, it is possible to furthermore improve a liquid-proof ability by contacting the leading end of the ring-shaped rib with the inner wall of the ring-shaped groove.

In order to furthermore achieve the aforementioned object, a valve attached to a fuel tank according to a fourth aspect of the present invention modifies the valve according to the first aspect of the present invention so that the cover has a case-contacting surface, which contacts with the case in the axial direction, the case has a cover-contacting surface, which faces the case-contacting surface, and an elastic member, which urges the cover and the case in directions separating the case-contacting surface and the cover-contacting surface away from each other, is further interposed between the case-contacting surface and the cover-contacting surface.

Namely, in the valve attached to the fuel tank according to the fourth aspect of the present invention, the elastic member, which urges the cover-contacting surface and the case-contacting surface in directions away from each other, is interposed between the cover-contacting surface and the case-contacting surface, which approach each other in the axial directions when the case is screwed to the cover. As described above, a helix-shaped fine space is formed between the male screw and female screw of the screwed portions. However, since the urging force of the elastic member is transmitted to the screwed portions, the side surfaces of the male screw and the side surfaces of the screwed groove, which neighbor with each other, are pressed and contacted with each other. For example, the upper side surfaces of the male screw and the upper side walls of the female screw are pressed to contact with each other.

By the valve attached to the fuel tank according to the fourth aspect of the present invention, it is possible to enhance a liquid-proof ability by pressing the side surfaces of the male screw and the side walls of the female screw to contact with each other.

In order to achieve the aforementioned object, a valve attached to a fuel tank according to a fifth aspect of the present invention comprises: a cover bonded to a fuel tank, being independent of the fuel tank, and including a connecting surface to be connected to the fuel tank, the connecting surface having a connector portion formed of a resin exhibiting a good bondability to the fuel tank; and a case bonded to the cover.

Namely, in the valve attached to the fuel tank according to the fifth aspect of the present invention, the reduction of component parts is intended by bonding the cover and the case while securing a liquid-proof ability to a certain extent or more. When the cover and the case are bonded together, it is easy to secure a liquid-proof ability. As described above, it is not necessary inherently to give a liquid-proof ability to the space between the case and the cover by bonding. However, in the valve attached to the fuel tank according to the fifth aspect of the present invention, the liquid-proof ability can be secured without disposing a sealing member, and the like, additionally. Consequently, it is possible to achieve the intended object (i.e., to reduce the number of component parts).

Therefore, in the valve attached to the fuel tank according to the fifth aspect of the present invention, when a flow-out passage, in which a vaporized fuel flows out, is disposed in the cover, and when an evaporator opening, which communicates with the flow-out passage, and a floating valve, which opens or closes the evaporator opening, are disposed in the cover, it is possible to secure a liquid-proof ability between the flow-out passage and the evaporator opening while reducing the number of component parts. Note that, when the case is welded to the cover, the liquid-proof ability is furthermore improved.

Moreover, in the valve attached to the fuel tank according to the fifth aspect of the present invention, when a flow-in passage, into which a supplied fuel flows in, is disposed in the cover, and when a valve body, which demarcates the flow-in passage and the fuel tank openably or closeably, is disposed in the case, it is possible to secure a liquid-proof ability between the flow-in passage and the fuel tank while reducing the number of component parts. Note that, when the case is welded to the cover, the liquid-proof ability is furthermore improved.

In order to achieve the aforementioned object, a valve attached to a fuel tank according to a sixth aspect of the present invention permits a vaporized fuel to flow out, inhibits a liquid fuel from flowing out, and comprises: a cover bonded to an upper portion of a fuel tank, being independent of the fuel tank, and including a connecting surface to be connected to the fuel tank, the connecting surface having a connector portion formed of a resin exhibiting a good bondability to the fuel tank, and a flow-out passage in which a vaporized fuel flows out; a case connected to the cover by claw engagement, and including an evaporator opening, communicating with the flow-out passage, and a floating valve for opening or closing the evaporator opening; the cover having a first surface; the case having a second surface neighboring the first surface; and an elastic lip erected on at least one of the first surface and the second surface and having a leading end contacted elastically with the other one of the first surface and the second surface.

Namely, in the valve attached to the fuel tank according to the sixth aspect of the present invention, the cover and the case are connected by claw engagement. Moreover, in order to inhibit the deterioration of the liquid-proof ability resulting from the above-described claw engagement, the elastic lip is erected on at least one of the first surface of the case and the second surface of the cover, and has the leading end contacted with the other one of the first surface and the second surface. The elastic lip can be formed as a ring-shaped film, etc. For instance, when the elastic lip is erected on the second surface of the case, the leading end of the elastic lip is contacted elastically with the first surface of the cover to secure a liquid-proof ability.

By the valve attached to the fuel tank according to the sixth aspect of the present invention, not only it is possible to connect the case and the cover by claw engagement with relative readiness, but also it is possible to secure a liquid-proof ability by the elastic lip.

In order to achieve the aforementioned object, a valve attached to a fuel tank according to a seventh aspect of the present invention permits a vaporized fuel to flow out, inhibits a liquid fuel from flowing out, and comprises: a cover bonded to an upper portion of a fuel tank, being independent of the fuel tank, and including a connecting surface to be connected to the fuel tank, the connecting surface having a connector portion formed of a resin exhibiting a good bondability to the fuel tank, and a flow-out passage in which a vaporized fuel flows out; and a case connected to the cover, and including an evaporator opening, communicating with the flow-out passage, and a floating valve for opening or closing the evaporator opening; wherein the cover and the case are connected by pressing-in and one of the cover and the case, to be pressed in into the other one thereof, has an outer peripheral surface, on which a flange portion, having a triangle-shaped cross section tapering from wide to narrow in the pressing-in direction, is formed.

Namely, in the valve attached to the fuel tank according to the seventh aspect of the present invention, the cover and the case are connected by pressing-in. On an outer peripheral surface of one of the cover and the case (i.e., the pressed-in member), the flange portion is formed which has a triangle-shaped cross section. Moreover, the flange portion is tapered gradually from wide to narrow in the pressing-in direction. Therefore, it is possible to press in the pressed-in member into the press-in receiving member with a relatively small press-in load. It is possible to secure a liquid-proof ability between the pressed-in member and the press-in receiving member by pressing the top surface of the flange portion to contact with an inner peripheral surface of the press-in receiving member. On the other hand, when pulling out the pressed-in member from the press-in receiving member, a relatively large pull-out load is needed because the flange portion acts like a wedge. Thus, when the pressed-in member is once pressed in into the press-in receiving member, the pressed-in member is less likely to fall off from the press-in receiving member.

By the valve attached to the fuel tank according to the seventh aspect of the present invention, it is possible to connect the case and the cover by the simple pressed-in arrangement with relative readiness. In addition, by the pressing-and-contacting action of the top surface of the flange portion, it is possible to secure a liquid-proof ability without employing a sealing member, such as an O ring, and the like.

In order to achieve the aforementioned object, a valve attached to a fuel tank according to an eighth aspect of the present invention permits a vaporized fuel to flow out, inhibits a liquid fuel from flowing out, and comprises: a cover bonded to an upper portion of a fuel tank, being independent of the fuel tank, and including a connecting surface to be connected to the fuel tank, the connecting surface having a connector portion formed of a resin exhibiting a good bondability to the fuel tank, and a flow-out passage in which a vaporized fuel flows out; and a case connected to the cover by claw engagement, and including an evaporator opening, communicating with the flow-out passage, and a floating valve for opening or closing the evaporator opening; wherein the case has a press-in portion to be pressed in into said cover and the press-in portion has an outer peripheral surface, on which a flange portion, having a triangle-shaped cross section tapering from wide to narrow in the pressing-in direction, is formed.

Namely, in the valve attached to the fuel tank according to the eighth aspect of the present invention, the cover and the case are connected by claw engagement. Moreover, in order to inhibit the deterioration of the liquid-proof ability resulting from the above-described claw engagement, the flange portion is formed on the outer peripheral surface of the press-in portion.

By the valve attached to the fuel tank according to the eighth aspect of the present invention, not only it is possible to connect the case and the cover by claw engagement with relative readiness, but also it is possible to secure a liquid-proof ability by the flange portion.

In order to furthermore achieve the aforementioned object, a valve attached to a fuel tank according a ninth aspect of the present invention modifies either one of the above-described valves attached to the fuel tank so that the connector portion of the cover is formed of an adhesive polyethylene, portions of the cover excepting the connector portion are formed of a polyamide, the case is formed of a reinforced polyamide, and the fuel tank is formed of a polyethylene.

Namely, in the valve attached to the fuel tank according to the ninth aspect of the present invention, the portions of the cover excepting the connector portion and the case are formed of the same kind of polyamide resins.

Because of the following reasons, the case is formed of a reinforced polyamide, and the portions of the cover excepting the connector portion are formed of a polyamide. Namely, since the case is placed in a manner immersed into a liquid fuel, there may be a fear that the case swells. When the case swells, as set forth above, there may arise a fear that the case falls off from the cover. In order to suppress the swelling, a reinforcement member, such as glass fibers, etc., is dispersed in a matrix composed of a polyamide. Thus, the case is upgraded in terms of the anti-swelling property.

While, regarding the cover, the issue is the fuel permeability. For instance, when the cover is formed of a material, such as a polyethylene, etc., the resulting cover exhibits a large fuel permeation. Taking the gradually strengthened evaporation regulation into consideration, it is necessary to make the cover from a material, which exhibits a fuel permeation as little as possible. A polyamide, which is used herein as a matrix of the case, exhibits a fuel permeation less. Consequently, a polyamide is an appropriate material for forming the case. Note that, since the cover is not placed in a liquid fuel, it is not necessary to take the anti-swelling property into account, and accordingly it is not required to reinforce a polyamide for making the case with glass fibers, and the like. Moreover, the cover might be subjected to mechanical shocks because of vibrations, and so on, which are transmitted from the other instruments, and the like, boarded on an automobile, etc. Note that, however, the cover might be degraded in terms of the shock resistance when it is formed of a polyamide reinforced with glass fibers, and so. Accordingly, the cover is formed of a not-reinforced polyamide.

Due to the aforementioned reasons, the case is formed of a reinforced polyamide, and the cover is formed of a not-reinforced polyamide.

Here, the cover is formed of a polyamide, there arises an issue of the bondability to a fuel tank. Namely, in many cases, a fuel tank, made from a resin, is formed of a polyethylene. However, the polyethylene and the polyamide exhibit extremely poor bondabilities to each other. Hence, the inventors of the present invention designed to dispose the connector portion, which is made from an adhesive polyethylene, in the connecting surface of the cover to be connected to the fuel tank. An adhesive polyethylene has functional groups, which bond to amide groups of a polyamide by denaturation with maleic anhydride, etc., in its side chains. Therefore, it is possible to weld the connector portion, formed of an adhesive polyethylene, to the cover, formed of a polyamide, by injection molding, and to weld the cover to a fuel tank, formed of a polyethylene, by hot-plate welding, respectively, for example. Note that the hot-plate welding is a method in which a heated steel plate is applied onto a surface of a component part to soften and thereafter the other resinous component part is applied onto the surface to weld the component parts with each other.

In accordance with the ninth aspect of the present invention, in the resulting valve attached to the fuel tank, it is possible to reduce the number of component parts. Moreover, it is possible to upgrade the anti-swelling property as well as the shock resistance.

In order to achieve the aforementioned object, a valve attached to a fuel tank according to a tenth aspect of the present invention comprises: a cover bonded to a fuel tank, being independent of the fuel tank, and including a connecting surface to be connected to the fuel tank, the connecting surface having a connector portion formed of a resin exhibiting a good bondability to the fuel tank, and a flow-in passage into which a supplied fuel flows in; and a case connected to the cover, and including a valve body demarcating the flow-in passage and the fuel tank openably or closeably; wherein the cover and the case are connected by pressing-in and one of the cover and the case, to be pressed in into the other one thereof, has an outer peripheral surface, on which a flange portion, having a triangle-shaped cross section tapering from wide to narrow in the pressing-in direction, is formed.

Namely, in the valve attached to the fuel tank according to the tenth aspect of the present invention, the cover and the case are connected by pressing-in. On an outer peripheral surface of one of the cover and the case (i.e., the pressed-in member), the flange portion is formed.

By the valve attached to the fuel tank according to the tenth aspect of the present invention, it is possible to connect the case and the cover by pressing-in with relative readiness. In addition, it is possible to secure a liquid-proof ability by the flange portion.

In accordance with the present invention, it is possible to provide a valve attached to a fuel tank, in which the bondability is good between a cover and a case, in which the liquid-proof ability is secured to a certain extent or more, whose construction is simple and whose number of component parts is less. In addition, it is possible to provide a valve attached to a fuel tank, valve which is good in terms of the anti-swelling property and the shock resistance.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

Hereinafter, specific examples of a valve attached to a fuel tank according to the present invention will be described.

EXAMPLE NO. 1

Example No. 1 embodies a valve attached to a fuel tank according to the present invention as a liquid-fuel flow-out inhibition valve.

Figure 1:
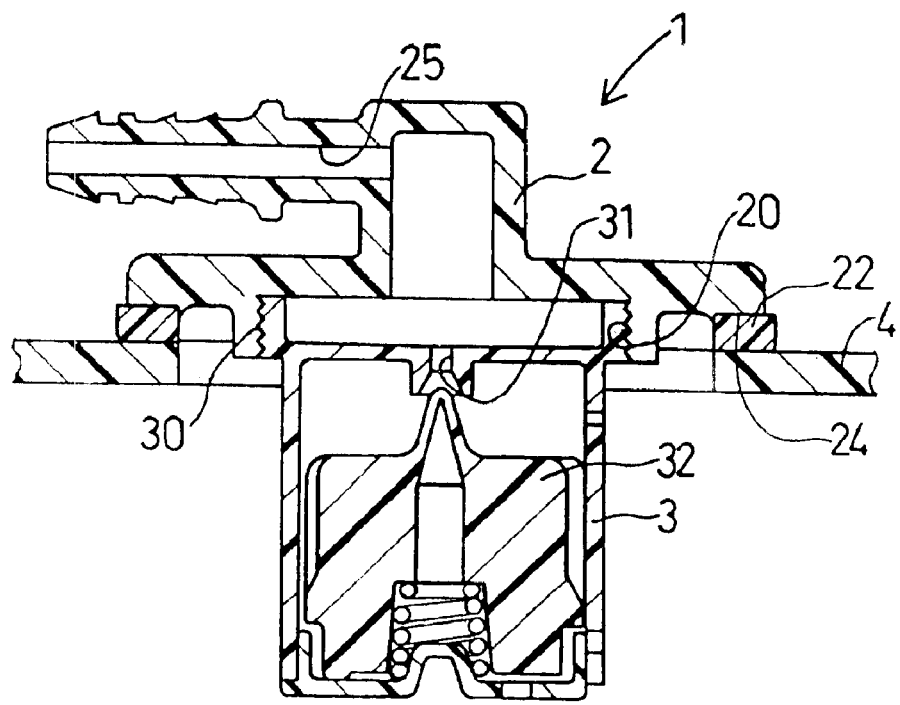
FIG. 1 illustrates a cross-sectional view of a liquid-fuel flow-out inhibition valve of Example No. 1 according to the present invention.

As illustrated in FIG. 1, a liquid-fuel flow-out inhibition valve 1 of Example No. 1 comprises a cover 2 and a case 3. The cover 2 includes a connecting surface 24, which is to be bonded with a fuel tank 4 and which has a connector portion 22, and a flow-out passage 25, which is disposed therein. The case 3 includes an evaporator opening 31, which is disposed at the central portion in the upper surface, and a floating valve 32, which is disposed therein. Moreover, a female screw 20 is formed in an opening-end inner peripheral surface of the cover 2, and a male screw 30 is formed on an outer peripheral surface of the case 3, respectively.

In Example No. 1, the cover 2 is formed of a polyamide. The connector portion 22 of the cover 2 is formed of an adhesive polyethylene. The case 3 is formed of a polyoxymethylene. The fuel tank 4 is formed of a high-density polyethylene.

The case 3 is formed of a polyoxymethylene because of the following reasons. The material is relatively less expensive. It is less likely to swell by fuels. Moreover, the evaporator opening 31, etc., can be formed of the material with high precision.

First, the cover 2, the case 3 and the floating valve 32 are produced by injection molding. In this process, the connector portion 22 is produced by two-color molding simultaneously with the cover 2. Subsequently, the cover 2 and the case 3 are connected by screwing the male screw 30 of the case 3 into the female screw 20 of the case 2. Finally, the fuel tank 4 is welded onto the connector portion 22. Thus, the liquid-fuel flow-out inhibition valve 1 of Example No. 1 is completed.

In Example No. 1, the cover 2 and the connector portion 22 are produced first by two-color molding. Subsequently, the fuel tank 4 is welded onto the connector portion 22 by hot-plate welding. However, the order of the welding operations, for example, the welding of the connector portion onto the cover and the welding of the fuel tank onto the connector portion, is not limited in particular. For instance, the following arrangements are available. The connector portion can be welded onto the fuel tank in advance, and thereafter the contacting surface of the cover can be welded onto the connector portion. Alternatively, the cover and the fuel tank can be welded together in one step by pressing the fuel tank and the cover while interposing the connector portion, which has been put into a melting state, therebetween. Moreover, the welding method is not limited in particular. For example, the component members can be welded together by an ultrasonic welding method, and so on.

Moreover, the cover and the connector portion can be formed of the same material integrally. This can be done in the following manner. For instance, when the cover and the connector portion of the cover is formed of the same polyethylene, a fuel tank, which is made from a high-density polyethylene, can be welded onto the connector portion.

When the cover and the case are formed of materials, which exhibit poor bondabilities to each other, the liquid-fuel flow-out inhibition valve of Example No. 1, in which the cover and the case are screwed together, is effective especially. However, note that the materials for forming the case and the cover are not limited in particular. Even when the cover and the case are formed of materials, which exhibit good bondabilities to each other, it is possible to complete a valve attached to a fuel tank according to the present invention. As for the materials for the cover and case, it is possible to list polyethylene, polybutylene terephthalate, ethylene vinyl alcohol polymer, resins made therefrom and reinforced by glass fibers, or the like, for example.

EXAMPLE NO. 2

Similarly to Example No. 1, Example No. 2 also embodies a valve attached to a fuel tank according to the present invention as a liquid-fuel flow-out inhibition valve.

Similarly to Example No. 1 illustrated in FIG. 1, a liquid-fuel flow-out inhibition valve 1 of Example No. 2 comprises a cover 2 and a case 3. The cover 2 includes a connecting surface 24, which is to be bonded with a fuel tank 4 and which has a connector portion 22, and a flow-out passage 25, which is disposed therein. The case 3 includes an evaporator opening 31, which is disposed at the central portion in the upper surface, and a floating valve 32, which is disposed therein. Moreover, a female screw 20 is formed in an opening-end inner peripheral surface of the cover 2, and a male screw 30 is formed on an outer peripheral surface of the case 3, respectively.

Figure 2:
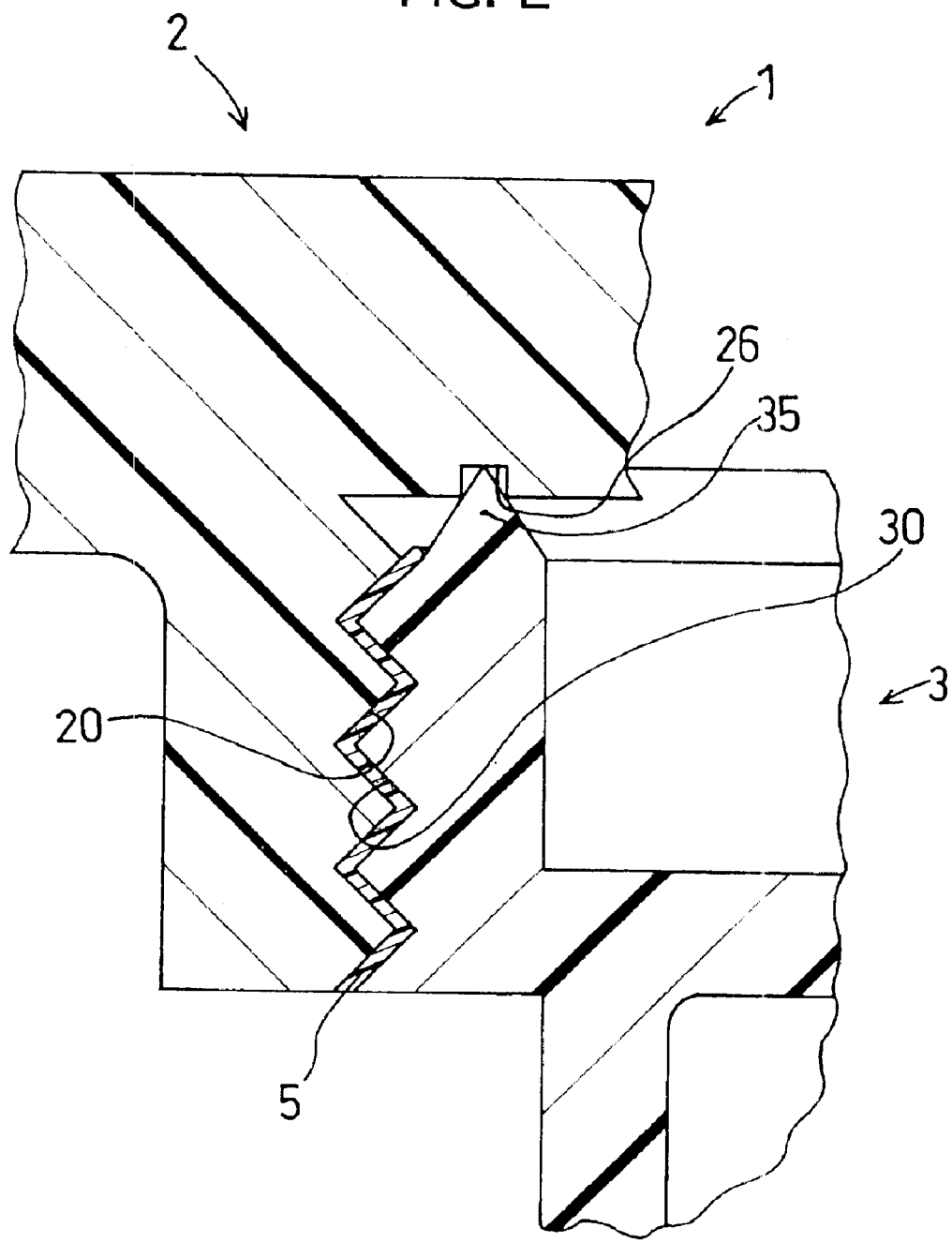
FIG. 2 illustrates an enlarged cross-sectional view of a liquid-fuel flow-out inhibition valve of Example No. 2 according to the present invention.

As illustrated in FIG. 2, an enlarged cross-sectional view of the liquid-fuel flow-out inhibition valve 1 of Example No. 2, the liquid-fuel flow-out inhibition valve 1 of Example No. 2 differs from that of Example No. 1 in the following features. First, a sealing tape 5, which is made from a resin, is wound around the case 3 between the female screw 20 of the cover 2 and the male screw 30 of the case 3. Second, a ring-shaped rib 35 is formed on the top-end surface of the case 3, and a ring-shaped groove 26 is formed in the bottom-end surface of the cover 2, which faces the top-end surface of the case 3.

Similarly to Example No. 1 described above, in Example No. 2 as well, the cover 2, the case 3 and the floating valve 32 are produced first by injection molding. Subsequently, the male screw 30 of the case 3 is screwed into the female screw 20 of the cover 2. In this instance, the ring-shaped rib 35 of the case 3 approaches the ring-shaped groove 26 of the cover 2 gradually. Then, the leading end of the ring-shaped rib 35 enters into the ring-shaped groove 26. The screwing is terminated when the leading end of the ring-shaped rib 35 is pressed onto and contacted with the inner wall of the ring-shaped groove 26. Thus, the liquid-proof ability between the case 3 and the cover 2 is secured by pressing the leading end of the ring-shaped rib 35 onto and contacting it with the inner wall of the ring-shaped groove 26. Finally, the fuel tank 4 is welded onto the connector portion 22. Thus, the liquid-fuel flow-out inhibition valve 1 of Example No. 2 is completed.

Also in Example No. 2, the order of the welding of the cover onto the connector portion of the cover and the welding of the fuel tank onto the connector portion of the cover as well as the welding method are not limited in particular. Likewise, the cover and the connector portion of the cover can be formed of the same material integrally.

Similarly to Example No. 1, in Example No. 2 as well, the cover 2 is formed of a polyamide. The connector portion 22 of the cover 2 is formed of an adhesive polyethylene. The case 3 is formed of a polyoxymethylene. The fuel tank 4 is formed of a high-density polyethylene. However, as set forth in Example No. 1, it is possible to employ an arrangement in which the cover and case are formed of the other resins.

In Example No. 2, the ring-shaped rib is formed on the case, and the ring-shaped groove is formed in the cover. However, the ring-shaped rib can be formed on the cover, and the ring-shaped groove can be formed in the case.

The portion, which the leading end of the ring-shape rib presses onto and contacts with, can be any inner wall of the ring-shaped groove. For example, it can be the side walls or bottom wall of the ring-shaped groove. Alternatively, the following arrangements are available. The leading end of the ring-shaped rib can be pressed onto and contacted with the bottom wall so that it cuts in into the bottom wall, or so that it breaks in the ring-shaped groove.

The cross-sectional shape of the leading end of the ring-shaped rib is not limited in particular, either. However, it can preferably be a triangle, a semi-circle, and the like, which tapers from wide to narrow in the direction toward the leading end. When it is tapered in the direction toward the leading end, the leading end plays a role of guide so that the ring-shaped rib can be securely fitted into the ring-shaped groove even if the positional relationship deviates more or less between the ring-shaped rib and the ring-shaped groove.

The number of the ring-shaped ribs, the number of the ring-shaped grooves and their disposing positions are not limited in particular. The ring-shaped rib and ring-shaped groove can be positioned arbitrary on two surfaces of the cover and case which face and contact with each other.

In Example No. 2, a solid sealing tape is used as the sealing member. However, it is possible to use a liquid gasket, which is insoluble to fuels.

EXAMPLE NO. 3

Similarly to Example No. 1, Example No. 3 also embodies a valve attached to a fuel tank according to the present invention as a liquid-fuel flow-out inhibition valve.

Figure 3:
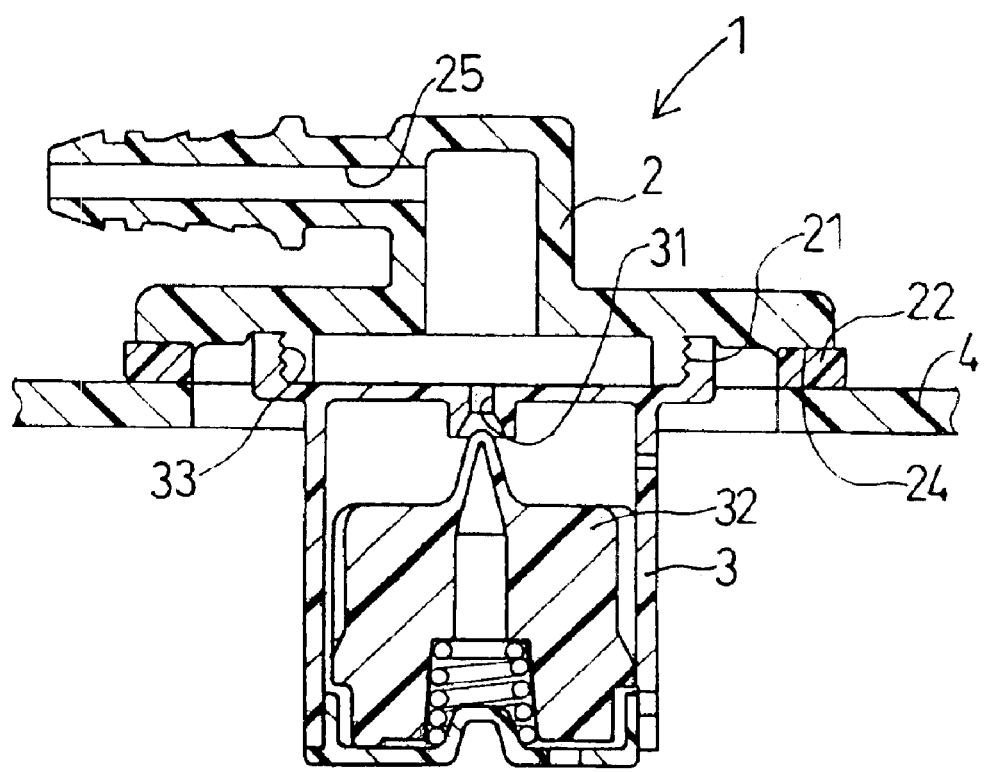
FIG. 3 illustrates a cross-sectional view of a liquid-fuel flow-out inhibition valve of Example No. 3 according to the present invention.

As illustrated in FIG. 3, a liquid-fuel flow-out inhibition valve 1 of Example No. 3 comprises a cover 2 and a case 3. The cover 2 includes a connecting surface 24, which is to be bonded with a fuel tank 4 and which has a connector portion 22, and a flow-out passage 25, which is disposed therein. The case 3 includes an evaporator opening 31, which is disposed at the central portion in the upper surface, and a floating valve 32, which is disposed therein. Moreover, a male screw 21 is formed in an opening-end outer peripheral surface of the cover 2, and a female screw 31 is formed on an inner peripheral surface of a cylinder-shaped extended portion of the case 3, respectively.

Similarly to Example No. 1 described above, in Example No. 3 as well, the cover 2, the case 3 and the floating valve 32 are produced first by injection molding. Subsequently, the cover 2 and the case 3 are connected by screwing the male screw 21 of the cover 2 into the female screw 33 of the case 3. Finally, the fuel tank 4 is welded onto the connector portion 22. Thus, the liquid-fuel flow-out inhibition valve 1 of Example No. 3 is completed.

Specifically, in Example No. 1, the case is disposed inside, and the cover is disposed outside. In Example No. 3, however, the relationship is inverted.

Also in Example No. 3, the order of the welding of the cover onto the connector portion of the cover and the welding of the fuel tank onto the connector portion of the cover as well as the welding method are not limited in particular. Likewise, the cover and the connector portion of the cover can be formed of the same material integrally.

Similarly to Example No. 1, in Example No. 3 as well, the cover 2 is formed of a polyamide. The connector portion 22 of the cover 2 is formed of an adhesive polyethylene. The case 3 is formed of a polyoxymethylene. The fuel tank 4 is formed of a high-density polyethylene. However, as set forth in Example No. 1, it is possible to employ an arrangement in which the cover and case are formed of the other resins.

Let us consider a case where the material, which forms the cover 2, has a swelling property, as does a polyethylene, when it is immersed into a liquid, such as a liquid fuel. If such is the case, when the cover and case are connected with each other while disposing the cover inside and the case outside, the liquid-proof property is furthermore enhanced because the space between the male screw and the female screw is narrowed by the swelling of the cover. Note that, when the case is contrarily formed of a material, which has a swelling property, it is preferable to employ such an arrangement that the case is disposed inside and the cover is disposed outside as they are disposed in Example No. 1.

EXAMPLE NO. 4

Similarly to Example No. 1, Example No. 4 also embodies a valve attached to a fuel tank according to the present invention as a liquid-fuel flow-out inhibition valve.

Similarly to Example No. 3 illustrated in FIG. 3, a liquid-fuel flow-out inhibition valve 1 of Example No. 4 comprises a cover 2 and a case 3. The cover 2 includes a connecting surface 24, which is to be bonded with a fuel tank 4 and which has a connector portion 22, and a flow-out passage 25, which is disposed therein. The case 3 includes an evaporator opening 31, which is disposed at the central portion in the upper surface, and a floating valve 32, which is disposed therein. Moreover, a male screw 21 is formed in an opening-end outer peripheral surface of the cover 2, and a female screw 33 is formed on an inner peripheral surface of a cylinder-shaped extended portion of the case 3, respectively.

Figure 4:
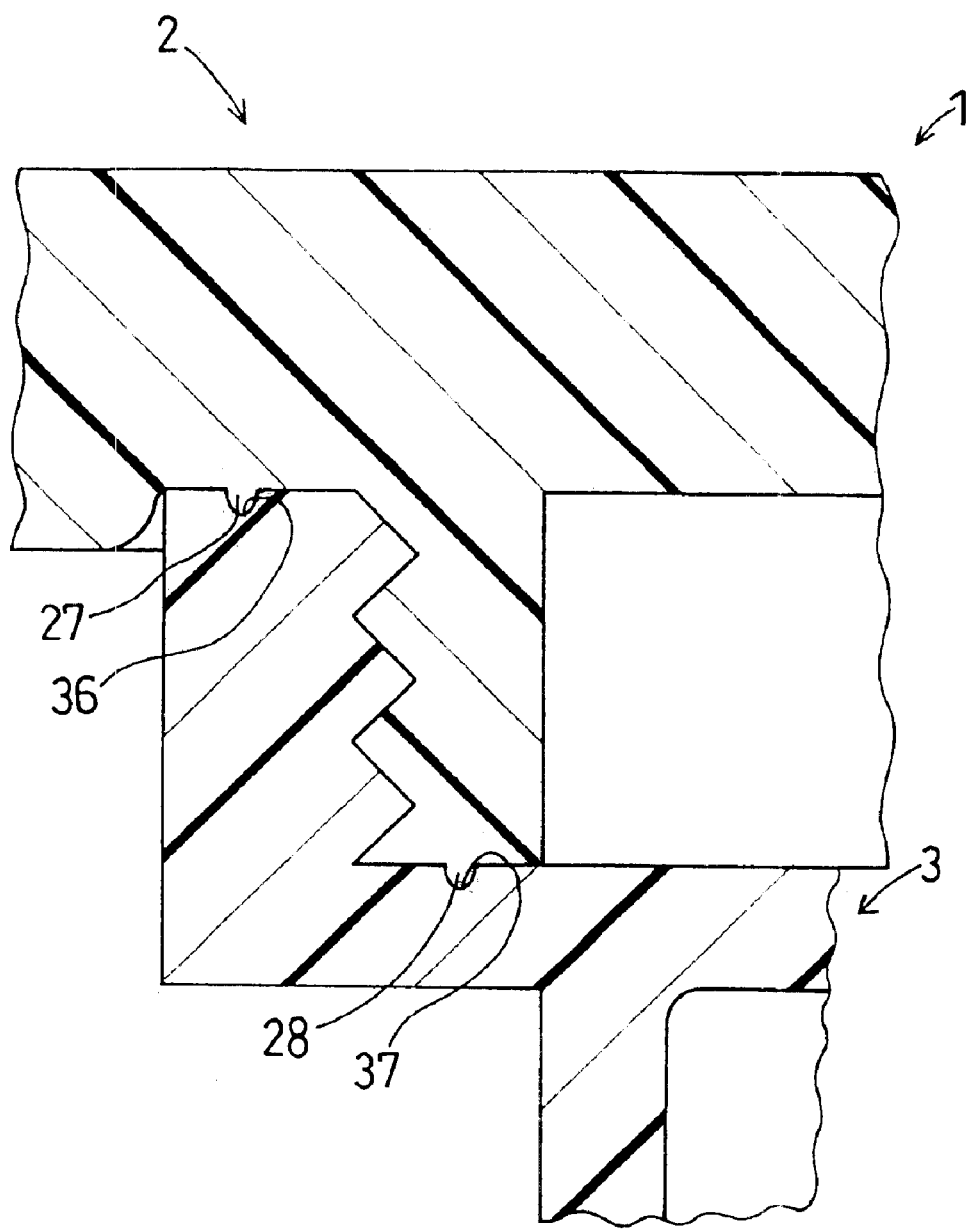
FIG. 4 illustrates an enlarged cross-sectional view of a liquid-fuel flow-out inhibition valve of Example No. 4 according to the present invention.

As illustrated in FIG. 4, an enlarged cross-sectional view of the liquid-fuel flow-out inhibition valve 1 of Example No. 4, the liquid-fuel flow-out inhibition valve 1 of Example No. 4 differs from that of the liquid-fuel inhibition valve 1 of Example No. 3 in the following features. First, a ring-shaped groove 36 is formed in a first top-end surface of the case 3, and a ring-shaped rib 27 is formed on a ring-shaped first lower surface of the cover 2, which faces the first top-end surface of the case 3. Second, a ring-shaped groove 37 is formed in a ring-shaped second upper surface of the case 3, and a ring-shaped rib 28 is formed on a second bottom-end surface of the cover 2, which faces to the second upper surface of the case 3.

Similarly to Example No. 3 described above, in Example No. 4 as well, the cover 2, the case 3 and the floating valve 32 are produced first by injection molding. Subsequently, the male screw 21 of the cover 2 is screwed into the female screw 33 of the case 3. In this instance, the ring-shaped rib 27 of the cover 2 approaches the ring-shaped groove 36 of the case 3, and the ring-shaped rib 28 of the cover 2 approaches the ring-shaped groove 37 of the case 3, respectively. Then, the two leading ends of the ring-shaped ribs 27, 28 enter into the facing ring-shaped grooves 36, 37, respectively, the screwing is terminated when the two leading ends of the ring-shaped rib 27, 28 are pressed onto and contacted with the inner walls of the facing ring-shaped grooves 36, 37. Thus, the liquid-proof ability between the case 3 and the cover 2 is secured by pressing the leading ends of the ring-shaped ribs 27, 28 onto and contacting them with the inner walls of the facing ring-shaped grooves 36, 37, respectively. Finally, the fuel tank 4 is welded onto the connector portion 22. Thus, the liquid-fuel flow-out inhibition valve 1 of Example No. 4 is completed.

Also in Example No. 4, the order of the welding of the cover onto the connector portion of the cover and the welding of the fuel tank onto the connector portion of the cover as well as the welding method are not limited in particular. Likewise, the cover and the connector portion of the cover can be formed of the same material integrally.

Similarly to Example No. 1, in Example No. 4 as well, the cover 2 is formed of a polyamide. The connector portion 22 of the cover 2 is formed of an adhesive polyethylene. The case 3 is formed of a polyoxymethylene. The fuel tank 4 is formed of a high-density polyethylene. However, as set forth in Example No. 1, it is possible to employ an arrangement in which the cover and case are formed of the other resins.

In Example No. 4, the ring-shaped ribs are formed on the cover, and the ring-shaped grooves are formed in the case. However, it is possible to form the ring-shaped ribs on the case and to form the ring-shaped grooves in the cover.

Similarly to Example No. 3, the portions, which the leading ends of the ring-shaped grooves press onto and contact with, can be any inner walls of the ring-shaped grooves. Further, the number of the ring-shaped ribs and ring-shaped grooves as well as the disposing positions thereof are not limited in particular. Furthermore, the cross-sectional shape of the leading ends of the ring-shaped ribs is not limited in particular. However, its cross-sectional shape can preferably be a triangular shape, a semi-circular shape, or the like, which is tapered from wide to narrow in the direction toward the leading end.

EXAMPLE NO. 5

Similarly to Example No. 1, Example No. 5 also embodies a valve attached to a fuel tank according to the present invention as a liquid-fuel flow-out inhibition valve.

Similarly to Example No. 3 illustrated in FIG. 3, a liquid-fuel flow-out inhibition valve 1 of Example No. 5 comprises a cover 2 and a case 3. The cover 2 includes a connecting surface 24, which is to be bonded with a fuel tank 4 and which has a connector portion 22, and a flow-out passage 25, which is disposed therein. The case 3 includes an evaporator opening 31, which is disposed at the central portion in the upper surface, and a floating valve 32, which is disposed therein. Moreover, a male screw 21 is formed in an opening-end outer peripheral surface of the cover 2, and a female screw 33 is formed on an inner peripheral surface of a cylinder-shaped extended portion of the case 3, respectively.

Figure 5:
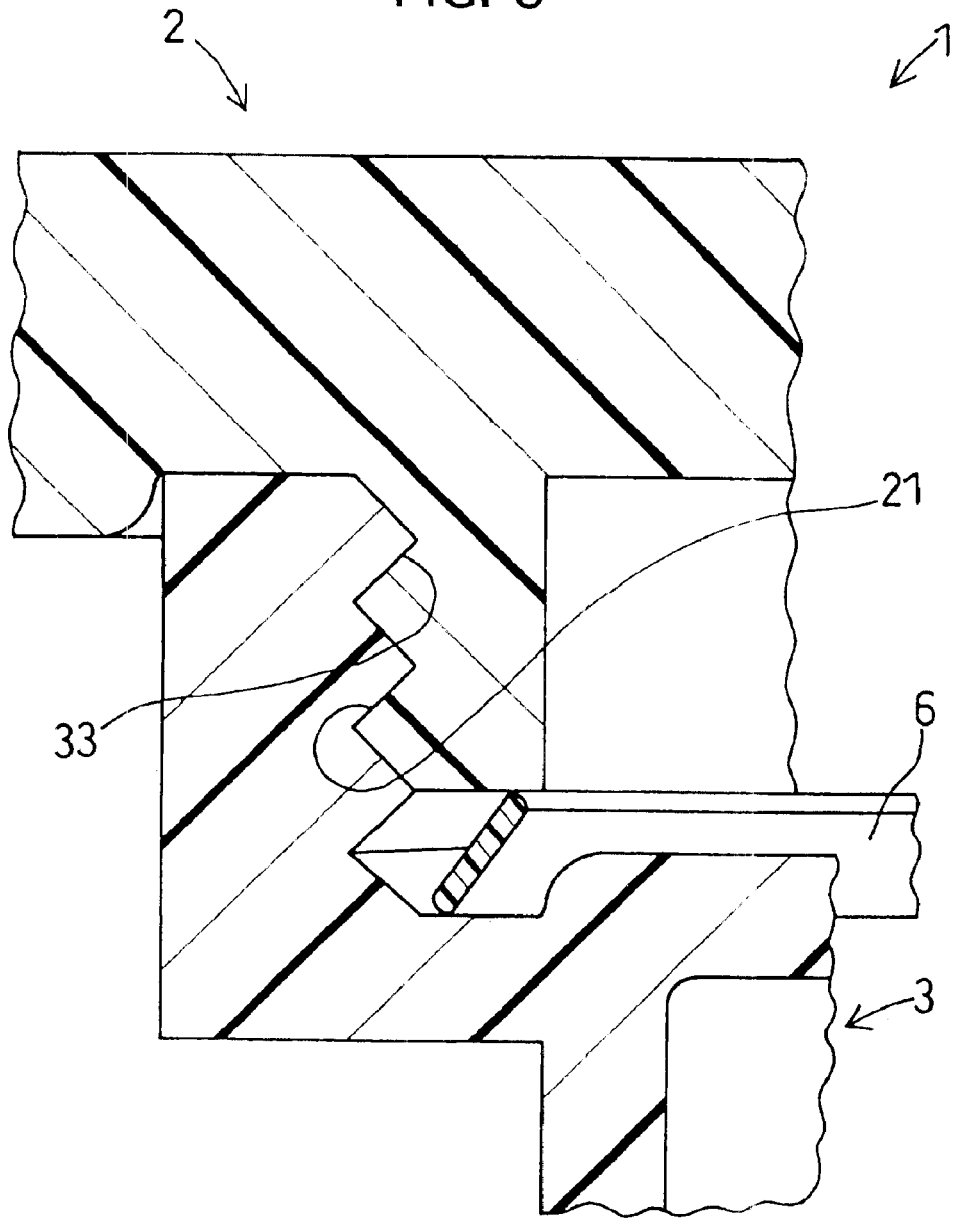
FIG. 5 illustrates an enlarged cross-sectional view of a liquid-fuel flow-out inhibition valve of Example No. 5 according to the present invention.

As illustrated in FIG. 5, the liquid-fuel flow-out inhibition valve 1 of Example No. 5 differs from that of Example No.

3 in the following feature. For instance, a ring-shaped coned disk spring 6 is interposed between a ring-shaped upper surface of the case 3 and a bottom-end surface of the cover 2, which faces the upper surface of the case 3.

Similarly to Example No. 3 described above, in Example No. 5 as well, the cover 2, the case 3 and the floating valve 32 are produced first by injection molding. Subsequently, the male screw 21 of the cover 2 is screwed into the female screw 33 of the case 3. In this instance, the lower end surface of the cover 2 approaches the upper end of the coned disk spring 6, which is placed on the upper surface of the case 3. Then, the screwing is terminated at a stage when the coned disk spring 6 is compressed to deform by a desired displacement between the lower end surface of the cover 2 and the upper surface of the case 3. The lower end surface of the cover 2 and the upper surface of the case 3 are pressed by the elastic force of the coned disk spring 6 in the directions separating away from each other. In Example No. 5, the liquid-proof ability between the case 3 and the cover 2 is secured by pressing the upper side surfaces of the male screw 21 of the cover 2 and the lower side surfaces of the female screw 33 of the case 3 to contact with each other by the elastic force. Finally, the fuel tank 4 is welded onto the connector portion 22. Thus, the liquid-fuel flow-out inhibition valve 1 of Example No. 5 is completed.

Also in Example No. 5, the order of the welding of the cover onto the connector portion of the cover and the welding of the fuel tank onto the connector portion of the cover as well as the welding method are not limited in particular. Likewise, the cover and the connector portion of the cover can be formed of the same material integrally.

Similarly to Example No. 1, in Example No. 5 as well, the cover 2 is formed of a polyamide. The connector portion 22 of the cover 2 is formed of an adhesive polyethylene. The case 3 is formed of a polyoxymethylene. The fuel tank 4 is formed of a high-density polyethylene. However, as set forth in Example No. 1, it is possible to employ an arrangement in which the cover and case are formed of the other resins.

In Example No. 5, the coned disk spring is used as the elastic member. However, the elastic member is not limited thereto in particular as far as it is insoluble to fuels and exhibits a desired elastic force. For example, it is possible to employ an arrangement in which a coiled spring, an elastic resin, or the like, is used.

The disposing position of the elastic member is not limited in particular. The elastic member can be disposed between two arbitrary surfaces of the cover and case, which faces each other.

EXAMPLE NO. 6

Similarly to Example No. 1, Example No. 6 also embodies a valve attached to a fuel tank according to the present invention as a liquid-fuel flow-out inhibition valve.

Figure 6:
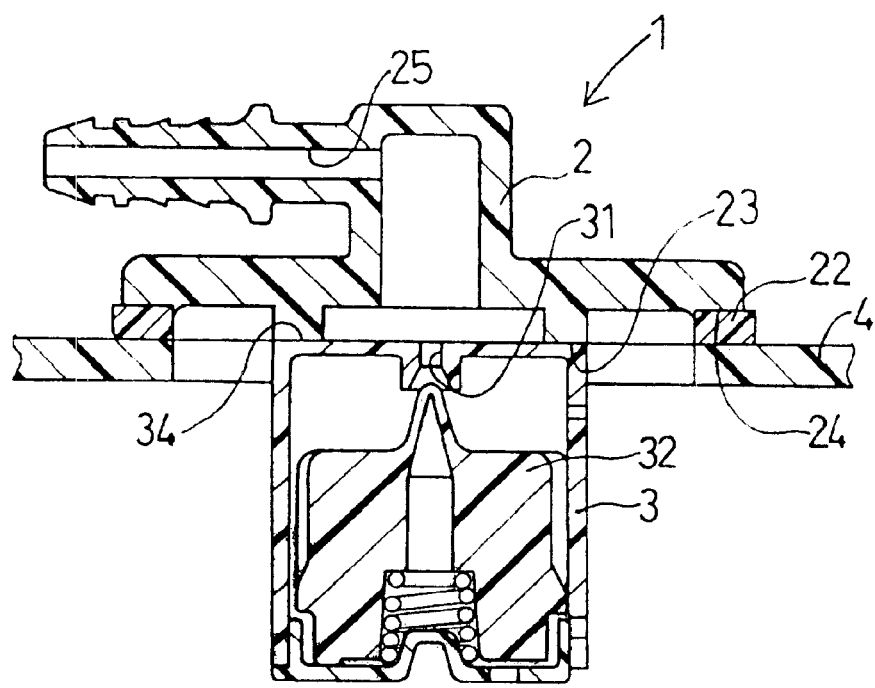
FIG. 6 illustrates a cross-sectional view of a liquid-fuel flow-out inhibition valve of Example No. 6 according to the present invention.

As illustrated in FIG. 6, a liquid-fuel flow-out inhibition valve 1 of Example No. 6 comprises a cover 2 and a case 3. The cover 2 includes a connecting surface 24, which is to be bonded with a fuel tank 4 and which has a connector portion 22, and a flow-out passage 25, which is disposed therein. The case 3 includes an evaporator opening 31, which is disposed at the central portion in the upper surface, and a floating valve 32, which is disposed therein. In Example No. 5, the cover 2 is formed of a polyamide. The connector portion 22 of the cover 2 is formed of an adhesive polyethylene. The case 3 is formed of a reinforced polyamide. The fuel tank 4 is formed of a high-density polyethylene.

In Example No. 6, the cover 2, the case 3 and the floating valve 32 are produced first by injection molding. Subsequently, a ring-shaped surface 23 of the cover 2 is welded onto a shoulder portion 34 of the case 3. Finally, the fuel tank 4 is welded onto the connector portion 22. Thus, the liquid-fuel flow-out inhibition valve 1 of Example No. 6 is completed.

The method of the welding of the ring-shaped surface 23 of the cover 2 onto the shoulder portion 34 of the case 3 is not limited in particular. For example, it is possible to employ such a method as ultrasonic welding, spin welding, hot-plate welding, laser welding, etc. Moreover, without especially providing the ring-shaped surface 23 in the cover 2, it is possible to employ such an arrangement that the case 3 is welded directly onto an end surface of the cover 2 in which the flow-out passage 25 is opened.

Also in Example No. 6, the order of the welding of the cover onto the connector portion of the cover and the welding of the fuel tank onto the connector portion of the cover as well as the welding method are not limited in particular. Likewise, the cover and the connector portion of the cover can be formed of the same material integrally. However, in Example No. 6 as well, it is possible to employ an arrangement in which the cover and case are formed of the other resins.

EXAMPLE NO. 7

Similarly to Example No. 1, Example No. 7 also embodies a valve attached to a fuel tank according to the present invention as a liquid-fuel flow-out inhibition valve.

Figure 7:
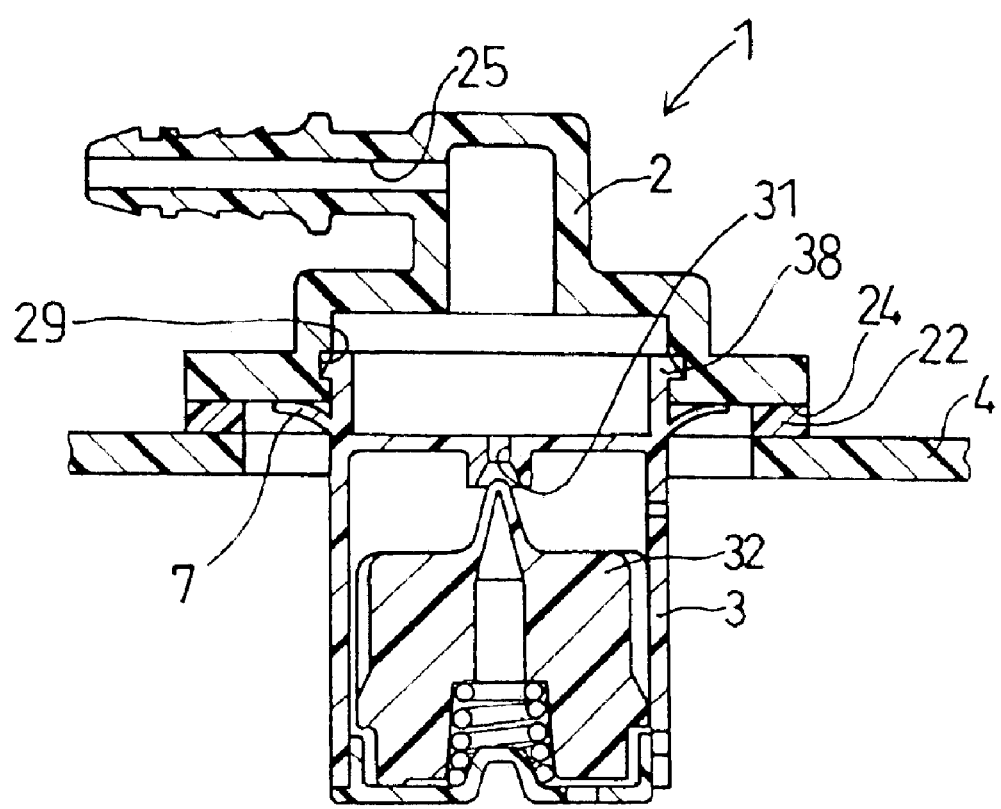
FIG. 7 illustrates a cross-sectional view of a liquid-fuel flow-out inhibition valve of Example No. 7 according to the present invention.

As illustrated in FIG. 7, a liquid-fuel flow-out inhibition valve 1 of Example No. 7 comprises a cover 2 and a case 3. The cover 2 includes a connecting surface 24, which is to be bonded with a fuel tank 4 and which has a connector portion 22, and a flow-out passage 25, which is disposed therein. The case 3 includes an evaporator opening 31, which is disposed at the central portion in the upper surface, and a floating valve 32, which is disposed therein. Further, an engagement groove 29 is formed in an opening-end inner peripheral surface of the cover 2, and an engagement claw 38 is formed on an upper-end outer peripheral surface of the case 3, respectively. Furthermore, a ring-shaped film-like elastic lip 7 is formed on an upward outer peripheral surface of the case 3 so that it enlarges its diameter as it extends toward the upper outer peripheral side.

In Example No. 7, the cover 2, the case 3 and the floating valve 32 are produced first by injection molding. Subsequently, the engagement claw 38 of the cover 3 is engaged with the engagement groove 29 of the cover 2. In this instance, the leading end of the elastic lip 7 contacts elastically with a ring-shaped lower surface of the cover 2 while it is put into a curved state. The liquid-proof ability between the case 3 and the cover 2 is secured by the elastic contact. Finally, the fuel tank 4 is welded onto the connector portion 22. Thus, the liquid-fuel flow-out inhibition valve 1 of Example No. 7 is completed.

In Example No. 7, the order of the welding of the cover onto the connector portion of the cover and the welding of the fuel tank onto the connector portion of the cover as well as the welding method are not limited in particular. Likewise, the cover and the connector portion of the cover can be formed of the same material integrally.

Similarly to Example No. 1, in Example No. 7 as well, the cover 2 is formed of a polyamide. The connector portion 22 of the cover 2 is formed of an adhesive polyethylene. The case 3 is formed of a polyoxymethylene. The fuel tank 4 is formed of a high-density polyethylene. However, as set forth in Example No. 1, it is possible to employ an arrangement in which the cover and case are formed of the other resins.

In Example No. 7, the elastic lip 7 is disposed on the upper outer peripheral surface of the case 3. The leading end of the elastic lip 7 is contacted elastically with the ring-shaped lower surface of the cover 2. It is possible to employ such an arrangement that a ring-shaped convexity, with which the leading end of the elastic lip 7 contacts, is disposed on the ring-shaped lower surface of the cover 2. When the ring-shaped convexity is disposed, the leading end of the elastic lip 7 contacts with the top surface of the ring-shaped convexity in a linearly contacting manner. As a result, the pressure increases in the elastically contacting portion, and thereby the liquid-proof ability can be furthermore enhanced.

In Example No. 7, the elastic lip is disposed on the case. The elastic lip can, however, be disposed on the cover. Moreover, the elastic lip can be formed on both of the cover and case. Note that, in view of the enhancement of the liquid-proof ability, the elastic lip can preferably be formed integrally with the cover or the case.

EXAMPLE NO. 8

Similarly to Example No. 1, Example No. 8 also embodies a valve attached to a fuel tank according to the present invention as a liquid-fuel flow-out inhibition valve.

Figure 8:
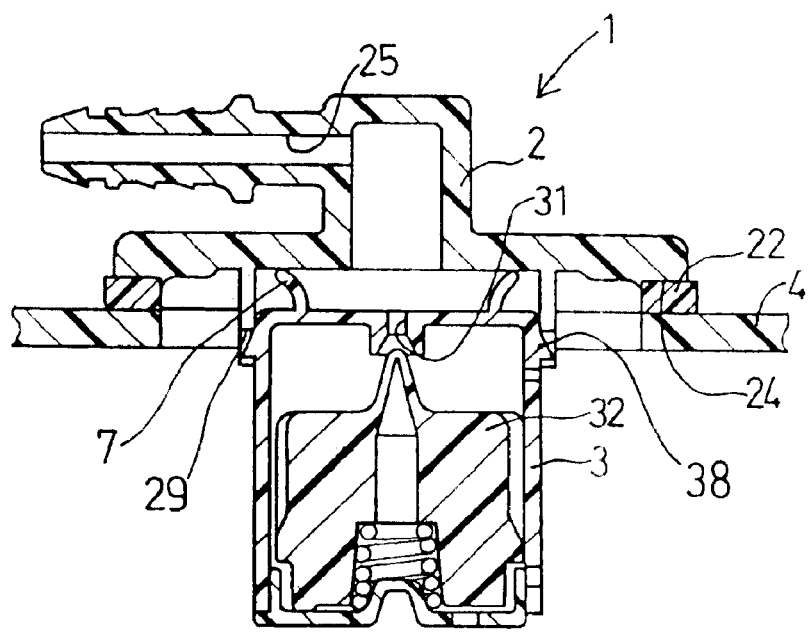
FIG. 8 illustrates a cross-sectional view of a liquid-fuel flow-out inhibition valve of Example No. 8 according to the present invention.

As illustrated in FIG. 8, a liquid-fuel flow-out inhibition valve 1 of Example No. 8 comprises a cover 2 and a case 3. The cover 2 includes a connecting surface 24, which is to be bonded with a fuel tank 4 and which has a connector portion 22, and a flow-out passage 25, which is disposed therein. The case 3 includes an evaporator opening 31, which is disposed at the central portion in the upper surface, and a floating valve 32, which is disposed therein. Further, an engagement groove 29 is formed at an opening end of the cover 2, and an engagement claw 38 is formed on an upper-end outer peripheral surface of the case 3, respectively. Furthermore, a ring-shaped film-like elastic lip 7 is formed on a ring-shaped upper surface of the case 3 so that it enlarges its diameter as it extends toward the upper outer peripheral side.

Similarly to Example No. 7, in Example No. 8, the cover 2, the case 3 and the floating valve 32 are produced first by injection molding. Subsequently, the engagement claw 38 of the cover 3 is engaged with the engagement groove 29 of the cover 2. In this instance, the leading end of the elastic lip 7 contacts elastically with the ring-shaped lower surface of the cover 2 while it is put into a curved state. The liquid-proof ability between the case 3 and the cover 2 is secured by the elastic contact. Finally, the fuel tank 4 is welded onto the connector portion 22. Thus, the liquid-fuel flow-out inhibition valve 1 of Example No. 8 is completed.

In Example No. 8, the order of the welding of the cover onto the connector portion of the cover and the welding of the fuel tank onto the connector portion of the cover as well as the welding method are not limited in particular. Likewise, the cover and the connector portion of the cover can be formed of the same material integrally.

Similarly to Example No. 1, in Example No. 8 as well, the cover 2 is formed of a polyamide. The connector portion 22 of the cover 2 is formed of an adhesive polyethylene. The case 3 is formed of a polyoxymethylene. The fuel tank 4 is formed of a high-density polyethylene. However, as set forth in Example No. 1, it is possible to employ an arrangement in which the cover and case are formed of the other resins.

Similarly to Example No. 7, in Example No. 8 as well, the disposing position of the elastic lip is not limited in particular. Likewise, the elastic lip can preferably be formed integrally with the cover or the case.

EXAMPLE NO. 9

Similarly to Example No. 1, Example No. 9 also embodies a valve attached to a fuel tank according to the present invention as a liquid-fuel flow but inhibition valve.

Figure 9:
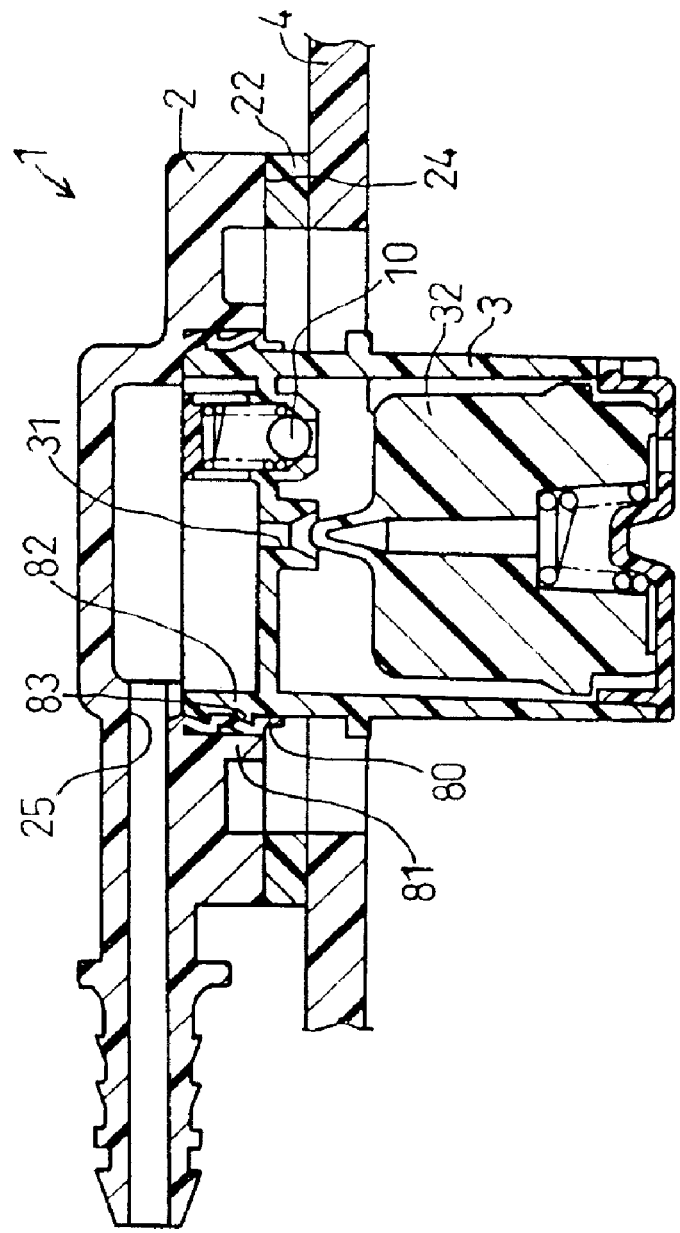
FIG. 9 illustrates a cross-sectional view of a liquid-fuel flow-out inhibition valve of Example No. 9 according to the present invention.
Figure 10:
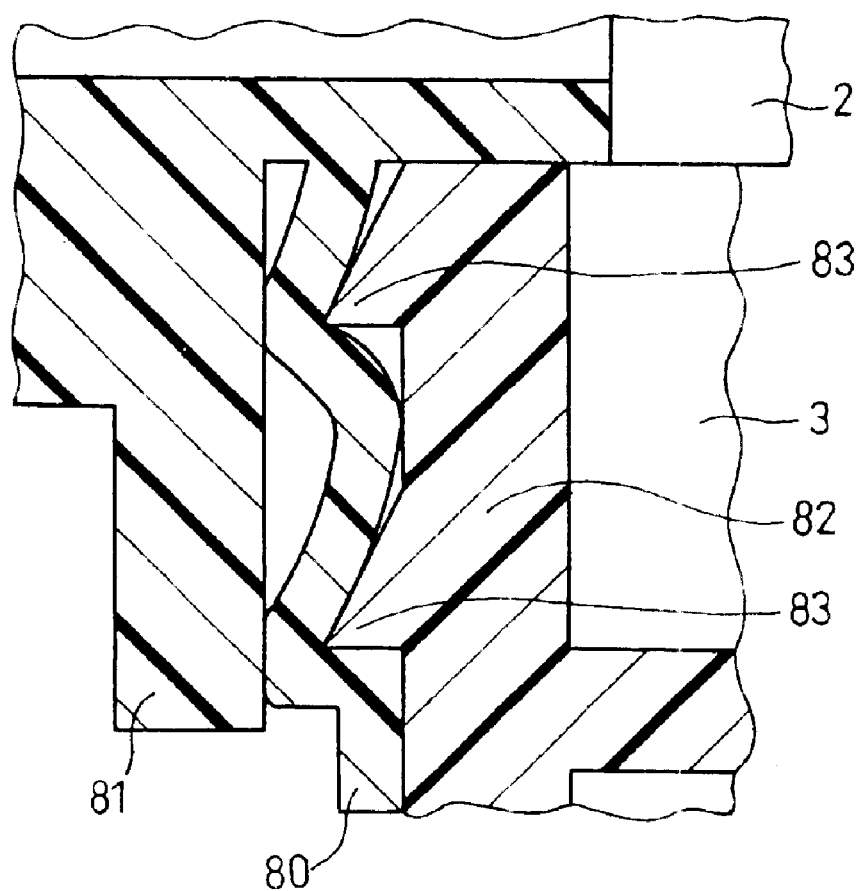
FIG. 10 illustrates an enlarged cross-sectional view of the liquid-fuel flow-out inhibition valve of Example No. 9.

As illustrated in FIG. 9, a liquid-fuel flow-out inhibition valve 1 of Example No. 9 comprises a cover 2 and a case 3. The cover 2 includes a connecting surface 24, which is to be bonded with a fuel tank 4 and which has a connector portion 22, and a flow-out passage 25, which is disposed therein. The case 3 includes an evaporator opening 31, which is disposed at the central portion in the upper surface, and a floating valve 32, which is disposed therein. Further, as enlargedly illustrated in FIG. 10, an inner cylinder-shaped portion 80, which extends downward, is formed at the opening end of the cover 2. Furthermore, an outer cylinder-shaped portion 81, which is disposed coaxially with the inner cylinder-shaped portion 80, is formed on the outer peripheral side of the inner cylinder-shaped portion 80. While, a press-in portion 82, which extends upward from the upper-surface peripheral end of the case 3, is formed. A flange portion 83 is formed in two stages on outer peripheral surfaces of the press-in portion 82, and has a triangle-shaped cross-section, which is tapered from wide to narrow in the upward direction. Note that, in the liquid-fuel flow-out inhibition valve 1 of Example No. 9, a relief valve 10 is further disposed which opens when a pressure becomes a predetermined value or more in the case 3.

When the press-in portion 82 is pressed in into the inner cylinder-shaped portion 80, the top surfaces of the flange portion 83 are pressed onto and contacted with the inner peripheral surface of the inner cylinder-shaped portion 80. The case 3 is connected with the cover 2 by the pressing and contacting. Moreover, the liquid-proof ability is secured between the cover 2 and the case 3. Note that the inner cylinder-shaped portion 80 deforms to diametrically enlarge when the press-in portion 82 is pressed in into the inner cylinder-shaped portion 80. When the magnitude of the deformation is large, the pressing-and-contacting force of the flange portion 83 onto the inner cylinder-shaped portion 80 becomes less. When the pressing-and-contacting force is small, there might arise a fear that the case 3 is likely to come off from the cover 2. Taking the fear into consideration, in the liquid-fuel flow-out inhibition valve 1 of Example No. 9, the outer cylinder-shaped portion 81 is disposed outside the inner cylinder-shaped portion 82 parallelly thereto. When the magnitude of the diametric deformation enlarges, the outer peripheral surface of the inner cylinder-shaped portion 80 contacts with the inner peripheral surface of the outer cylinder-shaped portion 81. The inner cylinder-shaped portion 80 cannot deform diametrically to such an extent or more by the contacting. Thus, the outer cylinder-shaped portion 81 plays a role of inhibiting the case 3 from coming off from the cover 2 by suppressing the diametrically enlarging deformation of the inner cylinder-shaped portion 80 when the press-in portion 82 is pressed in into the inner cylinder-shaped portion 80.

In Example No. 9, the cover 2, the case 3 and the floating valve 32 are first produced by injection molding. Subsequently, the press-in portion 82 of the case 3 is pressed into the inner cylinder-shaped portion of the cover 2. Finally, the fuel tank 4 is welded onto the connector portion 22. Thus, the liquid-fuel flow-out inhibition valve 1 of Example No. 9 is completed.

In Example No. 9, the order of the welding of the cover onto the connector portion of the cover and the welding of the fuel tank onto the connector portion of the cover as well as the welding method are not limited in particular. Likewise, the cover and the connector portion of the cover can be formed of the same material integrally.

Similarly to Example No. 1, in Example No. 9 as well, the cover 2 is formed of a polyamide. The connector portion 22 of the cover 2 is formed of an adhesive polyethylene. The case 3 is formed of a polyoxymethylene. The fuel tank 4 is formed of a high-density polyethylene. However, as set forth in Example No. 1, it is possible to employ an arrangement in which the cover and case are formed of the other resins.

In Example No. 9, the case 3 is provided with the flange portion 83, and the cover 2 is provided with the inner-cylinder-shaped portion 80, respectively. However, it is possible to employ such an arrangement that the case 3 is provided with the inner cylinder-shaped portion 80 and the cover 2 is provided with the flange portion 83. In Example No. 9, the flange portion 83 is formed in two stages. The number of the stages of the flange portion 83 is not limited in particular. Note that, since the more the number of the stage is the more the liquid-proof ability is enhanced, it can preferably be three stages or more. In Example No. 9, the outer cylinder-shaped portion 81 is disposed on the outer peripheral side of the inner cylinder-shaped portion 80. However, it is possible to employ an arrangement without the outer cylinder-shaped portion 81.

EXAMPLE NO. 10

Similarly to Example No. 1, Example No. 10 also embodies a valve attached to a fuel tank according to the present invention as a liquid-fuel flow-out inhibition valve.

Figure 11:
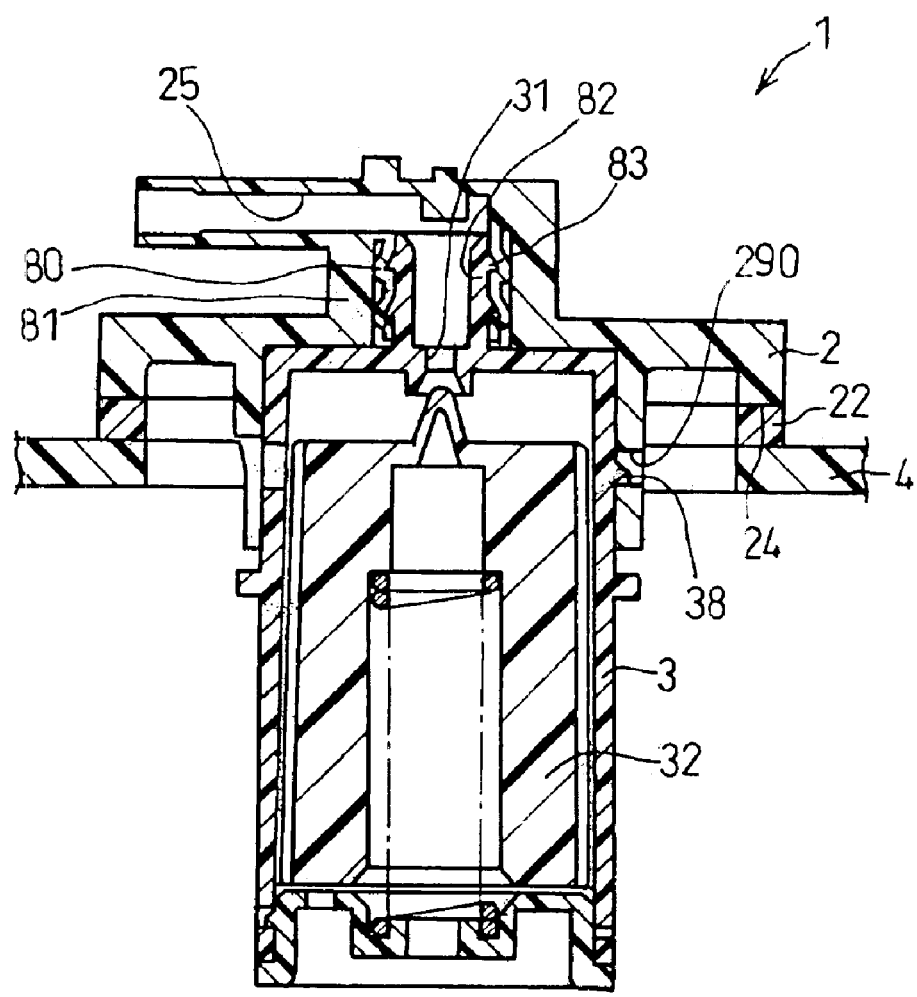
FIG. 11 illustrates a cross-sectional view of a liquid-fuel flow-out inhibition valve of Example No. 10 according to the present invention.
Figure 12:
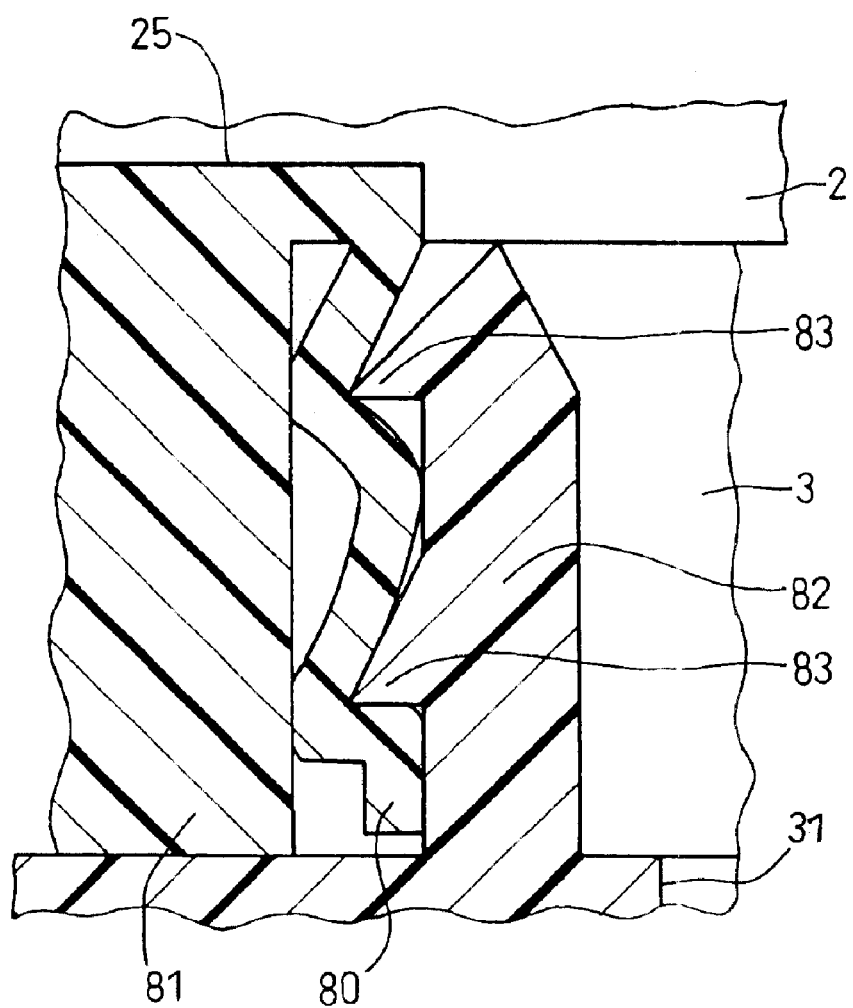
FIG. 12 illustrates an enlarged cross-sectional view of the liquid-fuel flow-out inhibition valve of Example No. 10.

As illustrated in FIG. 11, a liquid-fuel flow-out inhibition valve 1 of Example No. 10 comprises a cover 2 and a case 3. The cover 2 includes a connecting surface 24, which is to be bonded with a fuel tank 4 and which has a connector portion 22, and a flow-out passage 25, which is disposed therein. The case 3 includes an evaporator opening 31, which is disposed at the central portion in the upper surface, and a floating valve 32, which is disposed therein. Further, an engagement hole 290 is formed in a lower opening portion of the cover 2, and an engagement claw 38 is formed on an upper outer peripheral surface of the case 3, respectively. Furthermore, as enlargedly illustrated in FIG. 12, an inner cylinder-shaped portion 80, which extends downward, is formed in the cover 2. Moreover, an outer cylinder-shaped portion 81, which is disposed coaxially with the inner cylinder-shaped portion 80, is formed on the outer peripheral side of the inner cylinder-shaped portion 80. While, a press-in portion 82, which extends upward from the peripheral end of the evaporator opening 31 disposed in the upper surface of the cover 2, is formed. A flange portion 83 is formed in two stages on outer peripheral surfaces of the press-in portion 82, and has a triangle-shaped cross-section, which is tapered from wide to narrow in the upward direction.

When the press-in portion 82 is pressed in into the inner cylinder-shaped portion 80, the top surfaces of the flange portion 83 are pressed onto and contacted with the inner peripheral surface of the inner cylinder-shaped portion 80. The liquid-proof ability is secured between the cover 2 and the case 3 by the pressing and contacting. Note that the inner cylinder-shaped portion 80 deforms to diametrically enlarge when the press-in portion 82 is pressed in into the inner cylinder-shaped portion 80. When the magnitude of the deformation is large, the pressing-and-contacting force of the flange portion 82 onto the inner cylinder-shaped portion 80 becomes less. When the pressing-and-contacting force is small, there might arise a fear that the liquid-proof ability between the case 3 and the cover 2 lowers. Taking the fear into consideration, in the liquid-fuel flow-out inhibition valve 1 of Example No. 10, the outer cylinder-shaped portion 81 is disposed outside the inner cylinder-shaped portion 82 parallelly thereto. When the magnitude of the diametric deformation enlarges, the outer peripheral surface of the inner cylinder-shaped portion 80 contacts with the inner peripheral surface of the outer cylinder-shaped portion 81. The inner cylinder-shaped portion 80 cannot deform diametrically to such an extent or more by the contacting. Thus, the outer cylinder-shaped portion 81 plays a role of inhibiting the liquid-proof ability from lowering by suppressing the diametrically enlarging deformation of the inner cylinder-shaped portion 80 when the press-in portion 82 is pressed in into the inner cylinder-shaped portion 80.

In Example No. 10, the cover 2, the case 3 and the floating valve 32 are first produce by injection molding. Subsequently, the press-in portion 82 of the case 3 is pressed into the inner cylinder-shaped portion of the cover 2. Finally, the fuel tank 4 is welded onto the connector portion 22. Thus, the liquid-fuel flow-out inhibition valve 1 of Example No. 10 is completed.

In Example No. 10, the order of the welding of the cover onto the connector portion of the cover and the welding of the fuel tank onto the connector portion of the cover as well as the welding method are not limited in particular. Likewise, the cover and the connector portion of the cover can be formed of the same material integrally.

Similarly to Example No. 1, in Example No. 10 as well, the cover 2 is formed of a polyamide. The connector portion 22 of the cover 2 is formed of an adhesive polyethylene. The case 3 is formed of a polyoxymethylene. The fuel tank 4 is formed of a high-density polyethylene. However, as set forth in Example No. 1, it is possible to employ an arrangement in which the cover and case are formed of the other resins.

In Example No. 10, the flange portion 83 is formed in two stages. However, the number of the stages of the flange portion. 83 is not limited in particular. Note that, since the more the number of the stage is the more the liquid-proof ability is enhanced, it can preferably be three stages or more. In Example No. 10, the outer cylinder-shaped portion 81 is disposed on the outer peripheral side of the inner cylinder-shaped portion 80. However, it is possible to employ an arrangement in which, without disposing the inner cylinder-shaped portion 80, the press-in portion 81 is directly pressed in into the outer cylinder-shaped portion 81.

EXAMPLE NO. 11

Similarly to Example No. 6, Example No. 11 also embodies a valve attached to a fuel tank according to the present invention as a liquid-fuel flow-out inhibition valve.

The liquid-fuel flow-out inhibition valve of Example No. 11 differs from the liquid-fuel flow-out inhibition valve of Example No. 6 in that the cover and the connector portion are formed integrally. Therefore, only the difference will be described herein.

Figure 13:
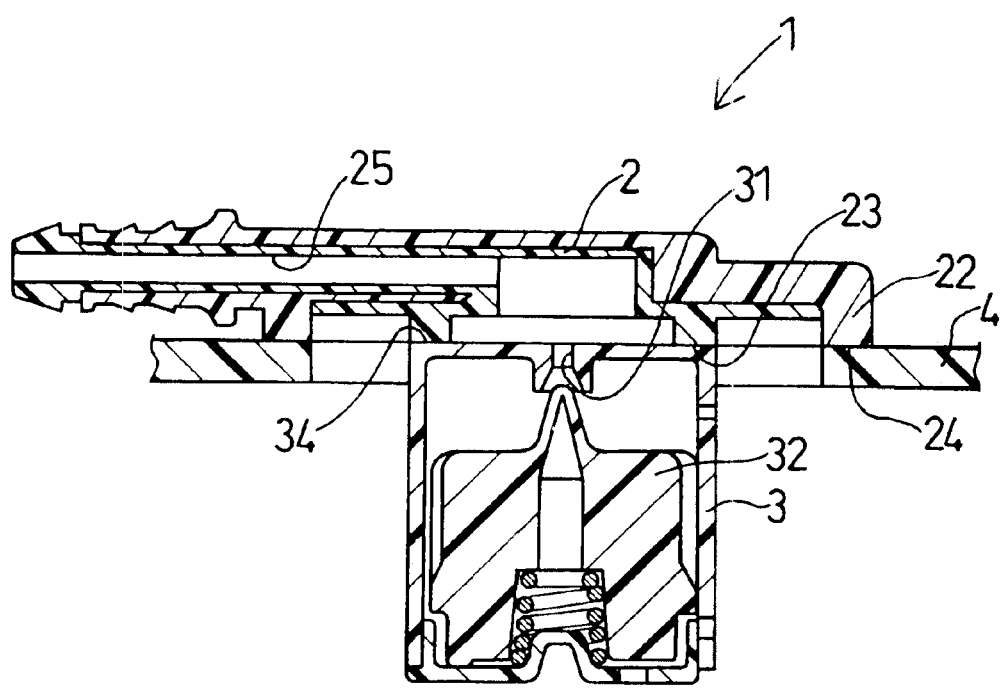
FIG. 13 illustrates a cross-sectional view of a liquid-fuel flow-out inhibition valve of Example No. 11 according to the present invention.

As illustrated in FIG. 13, the connector portion 22 of the liquid-fuel flow-out inhibition valve 1 of Example No. 11 is disposed so as to shield the cover 2. The cover 2 is formed of a polyamide. The connector portion 22 is formed of an adhesive polyethylene. The cover 2 and the connector portion 22 are produced by two-color molding. The cover 2 and the case 3 are bonded by laser welding. The bonding area between the cover 2 and the connector portion 22 in Example No. 11 is larger than those between the covers and the connector portions in the above-described other examples. Accordingly, the bonding strength between the cover 2 and the connector portion 22 of Example No. 11 is higher than the bonding strengths between the covers and the connector portions of the above-described other examples.

EXAMPLE NO. 12

Example No. 12 embodies a valve attached to a fuel tank according to the present invention as an inlet check valve.

Figure 14:
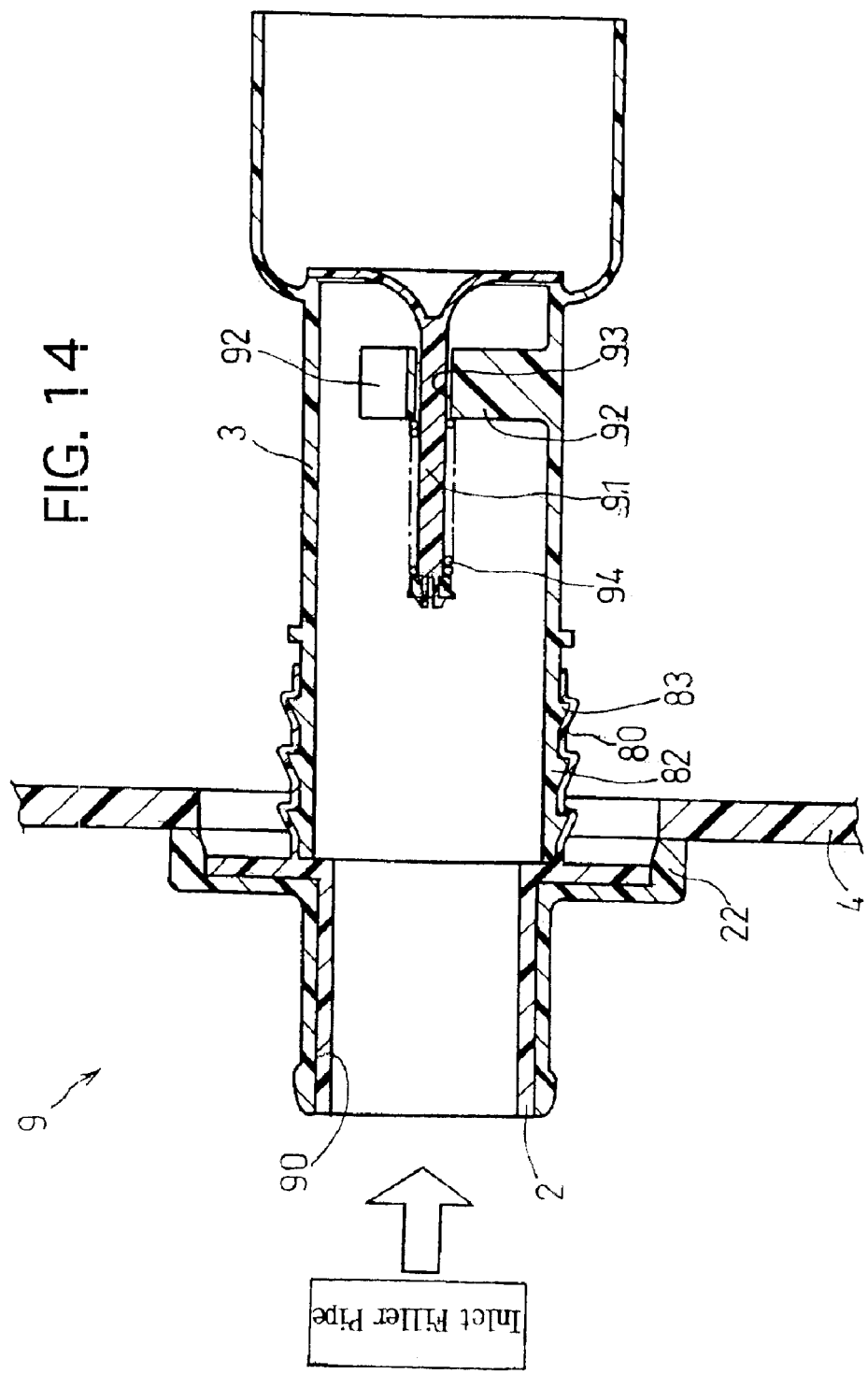
FIG. 14 illustrates a cross-sectional view of an inlet check valve of Example No. 12 according to the present invention.

As illustrate in FIG. 14, an inlet check valve 9 of Example No. 12 comprises a cover 2 and a case 3. The cover 2 is formed as a cylinder shape. The cover 2 is disposed so as to penetrate a side wall of a fuel tank 4. On the upstream side of the inner peripheral surface of the cover 2, a flow-in passage 90 is formed which is communicated with an inlet filler pipe. On the downstream side of the inner peripheral surface of the cover 2, an inner cylinder-shaped portion 80 is erected which extends toward the inside of the fuel tank 4.

The case 3 is formed as a cylinder shape. Three valve supporting bodies 92 are disposed at intervals of 120°, and are erected toward the center. A valve supporting hole 93 is formed at the center where the three valve supporting bodies 92 come together. Into the valve supporting hole 93, a valve body 91 is fitted so that it can reciprocate therein, and is expanded like a trumpet toward the downstream side. Note that the valve body 91 is urged by a coil spring 94 toward the upstream side. Thus, only when a fuel is supplied, the valve body 91 is designed so that it opens up a fuel passage by a pressure of a fuel, which flows in from the flow-in passage 90, against the urging force of the coil spring 94.

On an upstream side of the case 3, a press-in portion 82 is formed which has a flange portion 83. When the press-in portion 82 is pressed in into the inner cylinder-shaped portion 80 of the cover 2, the case 3 is connected with the cover 2. Moreover, the liquid-proof ability is thereby secured between the case 3 and the cover 2.

In Example No. 12, the cover 2, the case 3 and the valve body 91 are first produced by injection molding. In this process, a connector portion 22 is produced by two-color molding around the cover 2 simultaneously therewith. Subsequently, the press-in portion 82 of the case 3 is pressed in into the inner cylinder-shaped portion 80 of the cover 2. Finally, the fuel tank 4 is welded onto the connector portion 22. Thus, the inlet check valve 9 of Example No. 12 is completed.

In Example No. 12, the order of the welding of the cover onto the connector portion of the cover and the welding of the fuel tank onto the connector portion of the cover as well as the welding method are not limited in particular. Likewise, the cover and the connector portion of the cover can be formed of the same material integrally.

Similarly to Example No. 1, in Example No. 12 as well, the cover 2 is formed of a polyamide. The connector portion 22 of the cover 2 is formed of an adhesive polyethylene. The case 3 is formed of a polyoxymethylene. The fuel tank 4 is formed of a high-density polyethylene. However, as set forth in Example No. 1, it is possible to employ an arrangement in which the cover and case are formed of the other resins.

In Example No. 12, the case 3 is provided with the flange portion 83, and the cover 2 is provided with the inner cylinder-shaped portion 80. However, it is possible to employ an arrangement in which the case 3 is provided with the inner cylinder-shaped portion 80 and the cover 2 is provided with the flange portion 83. In Example No. 12, the flange portion 83 is formed in three stages. However, the number of the stages of the flange portion 83 is not limited in particular. Since the more the number of the stage is the more the liquid-proof ability is enhanced, the flange portion 83 can be formed in an appropriate number of stages while taking a desired liquid-proof ability into consideration.

EXAMPLE NO. 13

Similarly to Example No. 12, Example No. 13 also embodies a valve attached to a fuel tank according to the present invention as an inlet check valve.

The inlet check valve of Example No. 13 differs from the inlet check valve of Example No. 12 in that the cover and the case are bonded by welding. Therefore, only the difference will be described herein.

Figure 15:
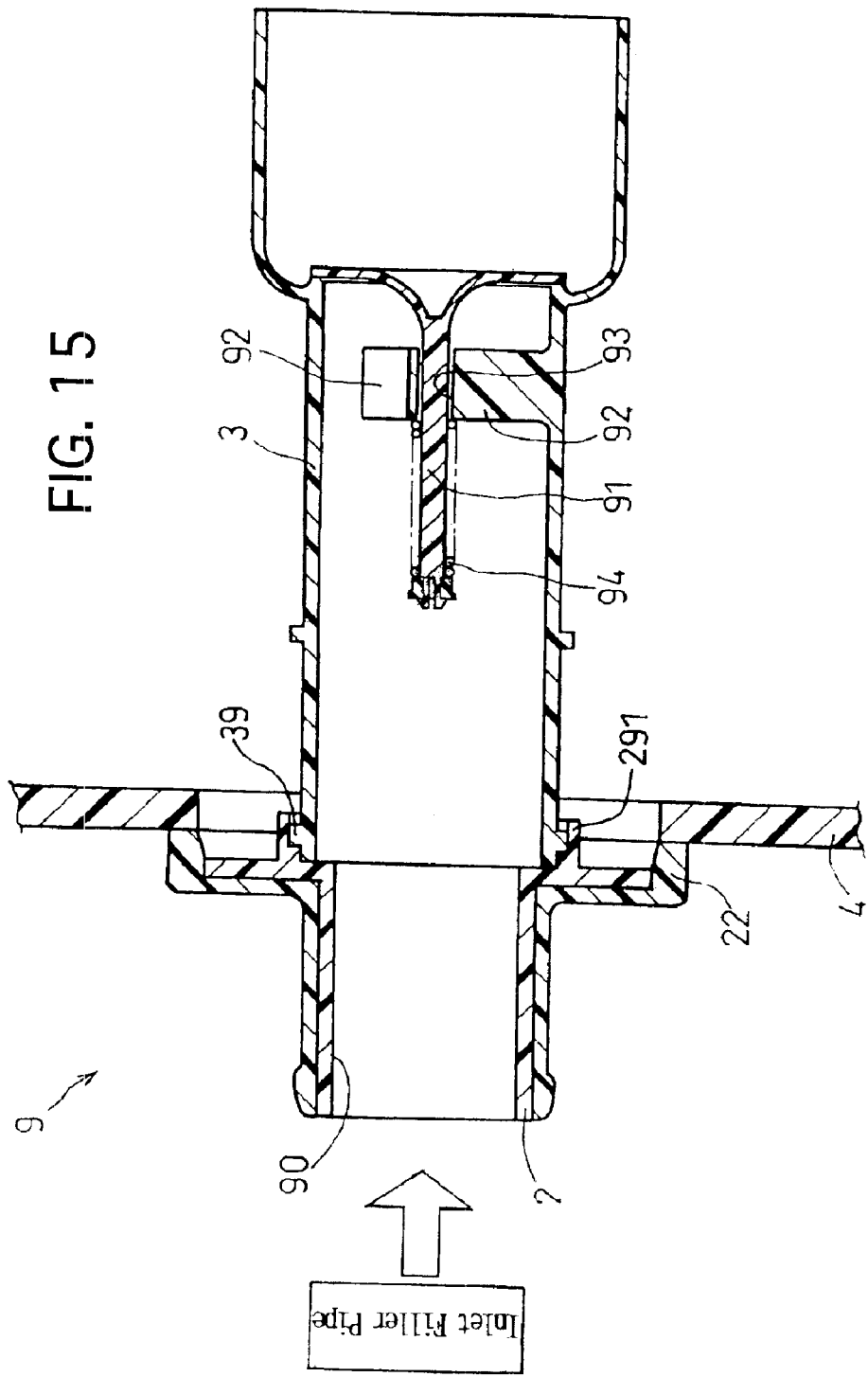
FIG. 15 illustrates a cross-sectional view of an inlet check valve of Example No. 13 according to the present invention.
Figure 16:
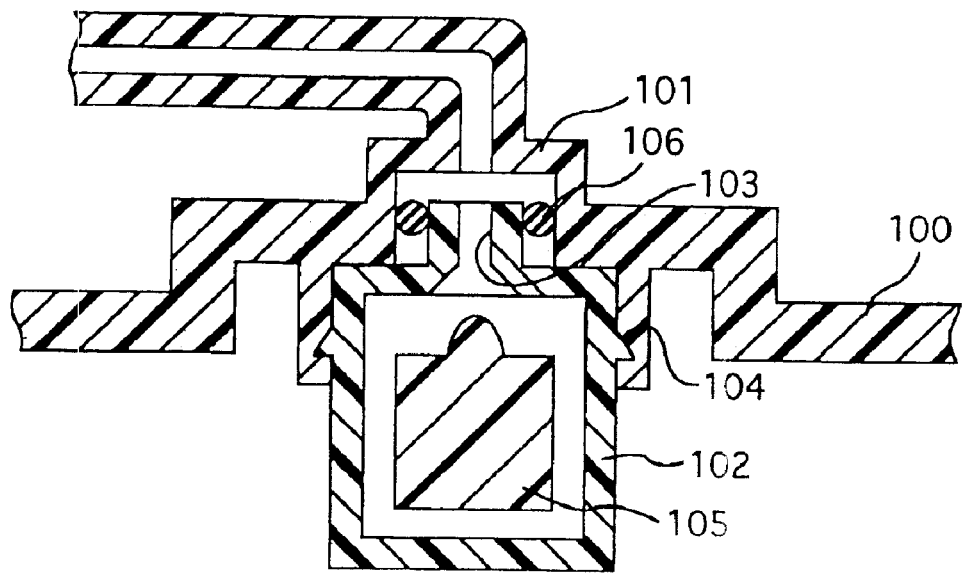
FIG. 16 illustrates a cross-sectional view of a conventional liquid-fuel flow-out inhibition valve.
Figure 17:
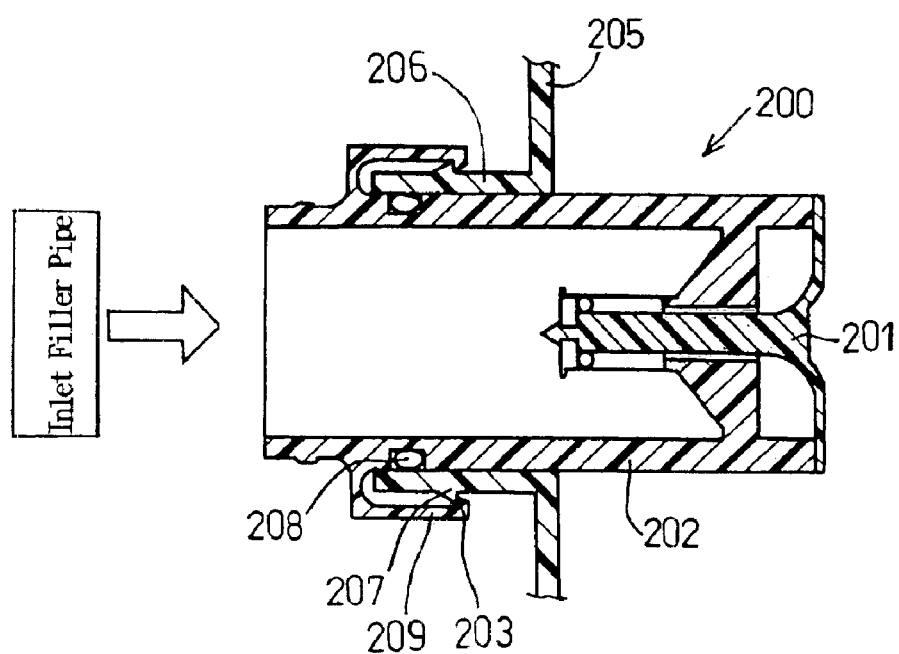
FIG. 17 illustrates a cross-sectional view of a conventional inlet check valve.

As illustrated in FIG. 15, the case 3 of the inlet check valve 9 of Example No. 13 has a flange-shaped weldment portion 39 at the opposite end toward the cover 2. The cover 2 has a minor cylinder-shaped portion 291 at the opposite end toward the case 3. The case is formed of a reinforced polyamide. The weldment portion 39 is welded onto the inner peripheral surface of the minor cylinder-shaped portion 291. In the inlet check valve 9 of Example No. 13, the cover 2 and case 3 are bonded by welding. Accordingly, compared with the inlet check valve 9 of Example No. 12, the inlet check valve 9 of Example No. 13 exhibits a much higher liquid-proof ability. Moreover, compared with the inlet check valve 9 of Example No. 12, the inlet check valve 9 of Example No. 13 is made of a much smaller number of component parts.

A valve attached to a fuel tank according the present invention has been described so far with reference to the modes of embodiment. However, the modes of embodiment are not limited to the above-describe specific examples in particular. It is possible to embody the present invention in modified or applied modes, which a person having ordinary skill in the art can carry out.

Having now fully described the present invention, it will be apparent to one of ordinary skill in the art that many changes and modifications can be made thereto without departing from the spirit or scope of the present invention as set forth herein including the appended claims.

What is claimed is:

1. A valve attached to a fuel tank, the valve comprising:
   a cover bonded to a fuel tank, wherein:
      the cover is independent of the fuel tank;
      the cover includes a connecting surface to be connected to the fuel tank;
      the connecting surface has a connector portion formed of a resin exhibiting a good bondability to the fuel tank;
      the cover is formed of polyamide;
      the connector portion is formed of an adhesive polyethylene;
      the cover and the connector portion are bonded to each other without inclusion by two-color molding; and
   a case bonded to the cover.

2. The valve according to claim 1, wherein said cover includes a flow-in passage into which a supplied fuel flows in; and
   said case includes a valve body demarcating the flow-in passage and the fuel tank openably or closeably.

3. The valve according to claim 2, wherein said case is welded to said cover.

4. The valve according to claim 2, wherein the connector portion of said cover is formed of an adhesive polyethylene, portions of said cover excepting the connector portion are formed of a polyamide, said case is formed of a reinforced polyamide, and said fuel tank is formed of a polyethylene.

5. A valve attached to a polyethylene fuel tank, the valve comprising:
   a cover bonded to the fuel tank wherein:
      the cover is independent of the fuel tank;
      the cover is formed of a polyamide;
      the cover includes a flow-in passage into which a supplied fuel flows;
      the cover includes a connecting surface to be connected to the fuel tank;
      the connecting surface has a connector portion formed of a resin exhibiting a good bondability to the fuel tank;
      the connector portion is formed of an adhesive polyethylene;
   a case bonded to the cover, wherein:
      the case is formed of a reinforced polyamide; and
      the case includes a valve body that opens and closes the flow-in passage.

\* \* \* \* \*